United States Patent
Lantz et al.

(10) Patent No.: US 12,266,387 B1
(45) Date of Patent: Apr. 1, 2025

(54) REWORKABLE TAPE TRACK FOLLOWING ACTUATOR

(71) Applicant: INTERNATIONAL BUSINESS MACHINES CORPORATION, Armonk, NY (US)

(72) Inventors: Mark Alfred Lantz, Adliswil (CH); Walter Haeberle, Waedenswil (CH); Simeon Furrer, Altdorf (CH); David Harper, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/524,046

(22) Filed: Nov. 30, 2023

(51) Int. Cl.
 *G11B 5/584* (2006.01)
 *G11B 5/008* (2006.01)

(52) U.S. Cl.
 CPC .......... *G11B 5/584* (2013.01); *G11B 5/00813* (2013.01)

(58) Field of Classification Search
 None
 See application file for complete search history.

(56) References Cited

U.S. PATENT DOCUMENTS

| | | | | |
|---|---|---|---|---|
| 4,203,606 A | * | 5/1980 | Obata | G11B 3/32 |
| 4,716,483 A | | 12/1987 | Walsh | |
| 4,870,518 A | | 9/1989 | Thompson | |
| 5,270,887 A | | 12/1993 | Edwards | |
| 5,379,170 A | * | 1/1995 | Schwarz | G11B 5/5504 |
| 5,450,257 A | * | 9/1995 | Tran | G11B 5/56 |
| 5,508,865 A | * | 4/1996 | La Garcia | G11B 5/584 |
| 5,638,237 A | * | 6/1997 | Phipps | G11B 5/40 |
| 5,726,834 A | | 3/1998 | Eckberg | |
| 6,075,678 A | * | 6/2000 | Saliba | G11B 21/088 |
| 7,342,738 B1 | * | 3/2008 | Anderson | G11B 5/584 |
| 8,154,811 B2 | | 4/2012 | Barsotti et al. | |
| 8,184,394 B2 | | 5/2012 | Poorman et al. | |
| 11,894,030 B2 | | 2/2024 | Biskeborn | |
| 11,935,563 B2 | | 3/2024 | Noda et al. | |
| 11,990,154 B1 | * | 5/2024 | Sakagami | G11B 21/086 |
| 11,990,164 B1 | | 5/2024 | Kuroki et al. | |
| 2004/0123448 A1 | | 7/2004 | Nguyen | |
| 2004/0184195 A1 | | 9/2004 | Nayak | |

(Continued)

FOREIGN PATENT DOCUMENTS

| | | |
|---|---|---|
| EP | 0364263 A2 | 4/1990 |
| WO | 2003/105133 A1 | 12/2003 |

OTHER PUBLICATIONS

Boettcher et al., "Dynamic Modeling and Control of a Piezo-Electric Dual-Stage Tape Servo Actuator," IEEE Transactions on Magnetics, vol. 45, No. 7, Jul. 2009, https://web.eng.ucsd.edu/mae/groups/callafon/research/publications/2009/IEEETonM1.pdf, pp. 3017-3024.

(Continued)

*Primary Examiner* — Peter Vincent Agustin
(74) *Attorney, Agent, or Firm* — Tihon Poltavets

(57) ABSTRACT

An apparatus for a reworkable tape track following actuator includes a spring actuator, a head module, a voice coil, and a mounting body, where the spring actuator is coupled to the mounting body and the mounting body is removable from a tape drive assembly. The apparatus further includes the head module being coupled to a middle section of the spring actuator and the voice coil being positioned beneath the head module.

19 Claims, 21 Drawing Sheets

(56) References Cited

U.S. PATENT DOCUMENTS

| | | | |
|---|---|---|---|
| 2004/0212916 A1* | 10/2004 | Nakao | G11B 5/584 |
| 2005/0081368 A1* | 4/2005 | Yao | G11B 5/6082 |
| 2005/0219756 A1* | 10/2005 | Dugas | G11B 21/24 |
| | | | 360/241 |
| 2006/0098331 A1* | 5/2006 | McCormack | G11B 5/584 |
| 2007/0053110 A1 | 3/2007 | Harper | |
| 2012/0206832 A1 | 8/2012 | Hamidi | |
| 2020/0258544 A1 | 8/2020 | Kobayashi | |

OTHER PUBLICATIONS

Raeymaekers et al., "Design of a dual stage actuator tape head with high-bandwidth track following capability," Microsyst Technol (2009) 15: pp. 1525-1529, Published: Feb. 19, 2009, https://link.springer.com/article/10.1007/s00542-009-0800-y.

IBM: List of IBM Patents or Patent Applications Treated as Related, Filed Herewith. 2 pages.

* cited by examiner

REWORKABLE TAPE TRACK FOLLOWING ACTUATOR

BACKGROUND

This disclosure relates generally to tape drives, and in particular, to a reworkable tape track following actuator for tape drives.

A tape drive is a data storage device that reads and writes data on a magnetic tape. For current tape drive designs, a replacement of a defective or damage tape head is facilitated by being able to remove a head-motor assembly (HMA) from a tape deck and replacing the old HMA with a new HMA. Subsequent to removal of the HMA from the tape deck, defective or damaged tape heads can also be removed from the HMA and the HMA can be reused with a newly installed tape head assembly. Future tape drive designs utilize a tape deck with an integrated actuator built into the tape deck with the tape head being glued into the actuator subsequent to assembly of the tape deck with the integrated actuator. Therefore, replacement of a defective or damaged tape head in future tape drive designs is more challenging when compared to current tape drive designs.

SUMMARY

One aspect of an embodiment of the present invention discloses an apparatus for a reworkable tape track following actuator, the apparatus comprising a spring actuator, a head module, a voice coil, and a mounting body, wherein the spring actuator is coupled to the mounting body and the mounting body is removable from a tape drive assembly. The head module is coupled to a middle section of the spring actuator and the voice coil is positioned beneath the head module.

Another aspect of an embodiment of the present discloses the apparatus further including a top section of the spring actuator disposed between a top plate and a middle block of the mounting body. A bottom section of the spring actuator disposed between a bottom plate and the middle block of the mounting body.

Another aspect of an embodiment of the present discloses the apparatus further including one or more block through holes of the mounting body for placement of one or more fasteners, wherein the one or more fasteners secures the middle block to the tape drive assembly.

Another aspect of an embodiment of the present discloses the apparatus further including the middle section of the spring actuator is at a skew equal to zero and the head module is coupled to the middle section of the spring actuator at a skew equal to zero.

Another aspect of an embodiment of the present discloses the apparatus further including the middle section of the spring actuator is at a skew greater than zero and the head module is coupled to the middle section of the spring actuator at a skew greater than zero.

Another aspect of an embodiment of the present discloses the apparatus further including the voice coil suspended between at least two magnets, wherein the at least two magnets are coupled to a base positioned in the tape drive assembly.

Another aspect of an embodiment of the present discloses the apparatus further including the spring actuator, the head module, the voice coil, and the mounting body are removable from the base positioned in the tape drive assembly.

Another aspect of an embodiment of the present discloses the apparatus further including one or more block through holes of the mounting body for placement of one or more fasteners, wherein the one or more fasteners secures the mounting body to the tape drive assembly.

Another aspect of an embodiment of the present discloses the apparatus further including the head module is coupled to the middle section of the spring actuator is positioned between two middle stiffener wings of the spring actuator.

Another aspect of an embodiment of the present discloses the apparatus further including an orientation of the voice coil is vertical and in parallel with a placement of the head module.

Another aspect of an embodiment of the present discloses the apparatus further including an orientation of the voice coil is vertical and perpendicular to a placement of the head module.

Another aspect of an embodiment of the present discloses the apparatus further including the voice coil suspended between two sets of two magnets coupled to a base positioned in the tape drive assembly, wherein one portion of the voice coil is suspended between a first set of the two magnets and another portion of the voice coil is suspended between a second set of the two magnets.

Another aspect of an embodiment of the present discloses the apparatus further including the spring actuator, the head module, the voice coil, and the mounting body are removable from the base positioned in the tape drive assembly.

Another aspect of an embodiment of the present discloses the apparatus further including one or more block through holes of the mounting body for placement of one or more fasteners, wherein the one or more fasteners secures the mounting body to the tape drive assembly.

Another aspect of an embodiment of the present discloses the apparatus further including an orientation of the voice coil is horizontal and perpendicular to a placement of the head module.

Another aspect of an embodiment of the present discloses the apparatus further including the head module coupled to the middle section of the spring actuator is positioned between two middle stiffener wings of the spring actuator.

Another aspect of an embodiment of the present discloses the apparatus further including an adhesive is utilized to couple the head module to the middle section of the spring actuator.

Another aspect of an embodiment of the present discloses the apparatus further including a first set of one or more fasteners secures the top section of the spring actuator between the top plate and the middle block. A second set of one or more fasteners secures the bottom section of the spring actuator between the bottom plate and the middle block.

Another aspect of an embodiment of the present discloses the apparatus further including the top section, the middle section, and the bottom section of the spring actuator form a C-shape for the spring actuator.

Another aspect of an embodiment of the present discloses the apparatus further including a first bend between the top section and the middle section. A second bend between the bottom section and the middle section, wherein the first bend and the second bend form the C-shape for the spring actuator.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

Figure 1:
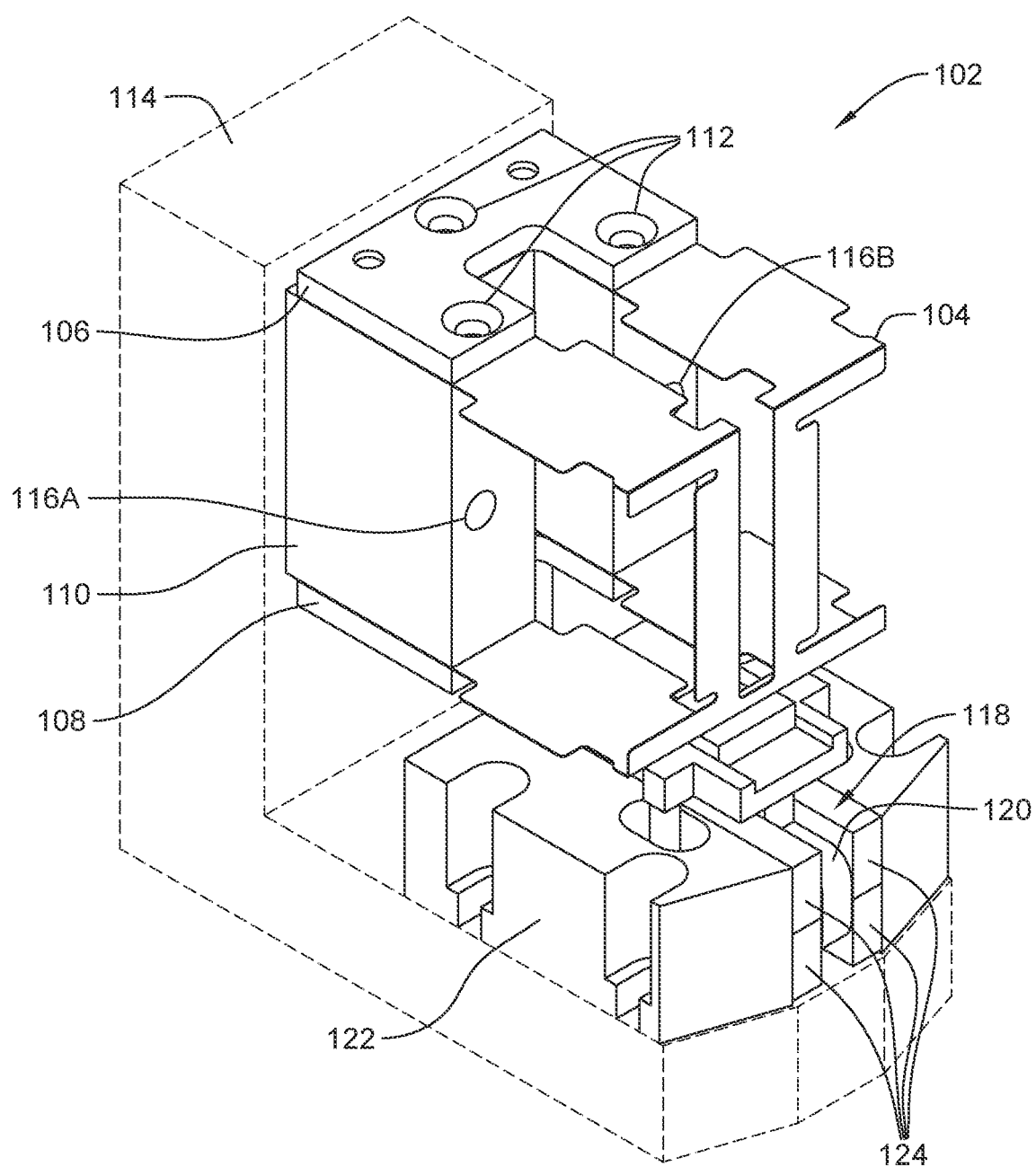
FIG. 1 depicts a three-dimensional view of an example of a reworkable tape track following actuator assembly with a spring actuator compatible with a zero-degree head rotation, in accordance with an embodiment of the present invention.

It will be appreciated that for simplicity and clarity purpose, elements shown in the drawings have not necessarily been drawn to scale. Further, and if applicable, in various functional block diagrams, two connected devices and/or elements may not necessarily be illustrated as being connected. In some other instances, grouping of certain elements in a functional block diagram may be solely for the purpose of description and may not necessarily imply that they are in a single physical entity, or they are embodied in a single physical entity.

DETAILED DESCRIPTION

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments. It is to be noted, the number of magnets and the specific location/configuration of the magnets are intended to be illustrative and not restricted to the embodiments described herein.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

Moreover, although various reference numerals may be used across different drawings, the same or similar reference numbers are used throughout the drawings to denote the same or similar features, elements, or structures, and thus detailed explanations of the same or similar features, elements, or structures may not be repeated for each of the drawings for economy of description. Labelling for the same or similar elements in some drawings may be omitted as well in order not to overcrowd the drawings.

Embodiments of the present invention provide a reworkable tape track following actuator assembly that implements an open voice coil actuator design with a head suspension that is mounted to the actuator body/coarse positioning system utilizing a set of screws that are accessible from a side of the tape drive after removing a drive cover. Removing the set of screws allows for the head, suspension, and voice coil subassembly to be removed from the actuator body without removing the entire actuator from the deck. A new suspension and voice coil can subsequently be mounted in the actuator body/tape deck and a replacement head assembly installed in the reworked actuator.

FIG. 1 depicts a three-dimensional view of an example of a reworkable tape track following actuator assembly with a spring actuator compatible with a zero-degree head rotation, in accordance with an embodiment of the present invention. In this embodiment, reworkable tape track following actuator assembly 102 includes spring actuator 104 folded into a C-shape and includes a zero-degree offset. Spring actuator 104 includes a first bend between a top section and a middle section and a second bend between a middle section and a bottom section. Spring actuator 104 is installed on reworkable tape track following actuator assembly 102 that includes top plate 106, bottom plate 108, and middle block 110, where a cabled head assembly is not disposed in spring actuator 104 for illustrative purposes. Top plate 106, bottom plate 108, and middle block 110 form a mounting body for reworkable tape track following actuator assembly 102.

Figure 4:
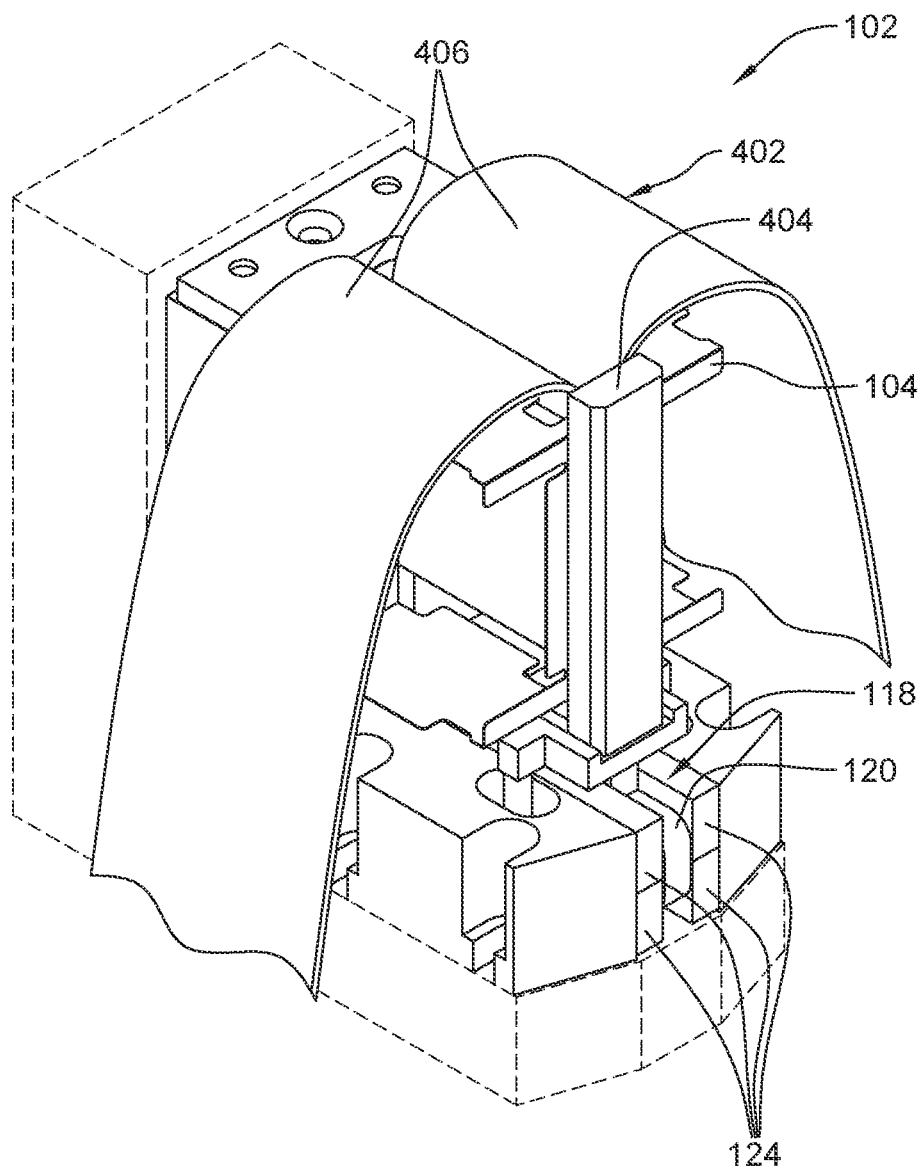
FIG. 4 depicts a three-dimensional view of an example of a reworkable tape track following actuator assembly from FIG. 1 with an installed cabled head assembly, in accordance with an embodiment of the present invention.

Reworkable tape track following actuator assembly 102 with disposed cabled head assembly in spring actuator 104 is discussed in further detail with regards to FIG. 4. A portion of a top section of spring actuator 104 is disposed between a bottom surface of top plate 106 and a top surface of middle block 110. A portion of a bottom section of spring actuator 104 is disposed between a top surface of bottom plate 108 and a bottom surface of middle block 110. Top plate 106 and bottom plate 108 each have a U-shaped cut out for placement of the cabled head assembly when disposed in a cavity of the top section, the middle section, and the bottom section, of spring actuator 104.

In this embodiment, top plate 106 includes three holes 112 for placement of three fasteners (e.g., screw, bolt) to secure the portion of the top section of spring actuator 104 between top plate 106 and middle block 110, where each of the three fasteners pass through a respective through hole of the top section of spring actuator 104. The three holes 112 of top plate 106 are countersunk, where a tapered fastener is disposed in each of the three holes 112 (not illustrated in FIG. 1) and a top head portion of each tapered fastener is on a similar planar surface as a top surface of top plate 106. In other embodiments, a number of holes 112 and a placement of holes 112 can vary depending on the mounting requirements for spring actuator 104.

In this embodiment, bottom plate 108 includes three holes (not visible in FIG. 1) for placement of three fasteners to secure the portion of the bottom section of spring actuator 104 between bottom plate 108 and middle block 110, where each of the three fasteners pass through a respective through hole of the bottom section of spring actuator 104. The three holes of bottom plate 108 are countersunk, where a tapered fastener is disposed in each of the three holes (not illustrated in FIG. 1) and a top head portion of each tapered fastener is on a similar planar surface as a bottom surface of bottom plate 108. In other embodiments, similar to holes 112 of the top section of spring actuator 104, a number of holes in bottom plate 108 and a placement of the holes in bottom plate 108 can vary depending on the mounting requirements for spring actuator 104. Middle block 110 is mounted on fixture 114 for illustrative purposes and does not represent a portion of a tape drive assembly to which middle block 110 of the actuator assembly is mounted. Middle block 110 includes block through hole 116A and 116B for placement of a fastener for mounting reworkable tape track following actuator assembly 102 to an actuator body in the tape drive assembly.

As previously mentioned, for illustrative purposes a cabled head assembly is not disposed in a cable slot of spring actuator 104 of reworkable tape track following actuator assembly 102. Coil assembly 118 with voice coil 120 is positioned between base 122 that includes magnets 124 positioned on opposite sides of voice coil 120, where base 122 is attachable to the tape drive assembly or integrated into the tape drive assembly. Voice coil 120 is suspended between magnets 124, where magnets 124 are coupled to base 122. Coil assembly 118 is positioned beneath a bottom section of spring actuator 104. In this embodiment, an orientation of voice coil 120 is vertical and in parallel with a placement of the cabled head assembly in spring actuator 104.

Figure 2:
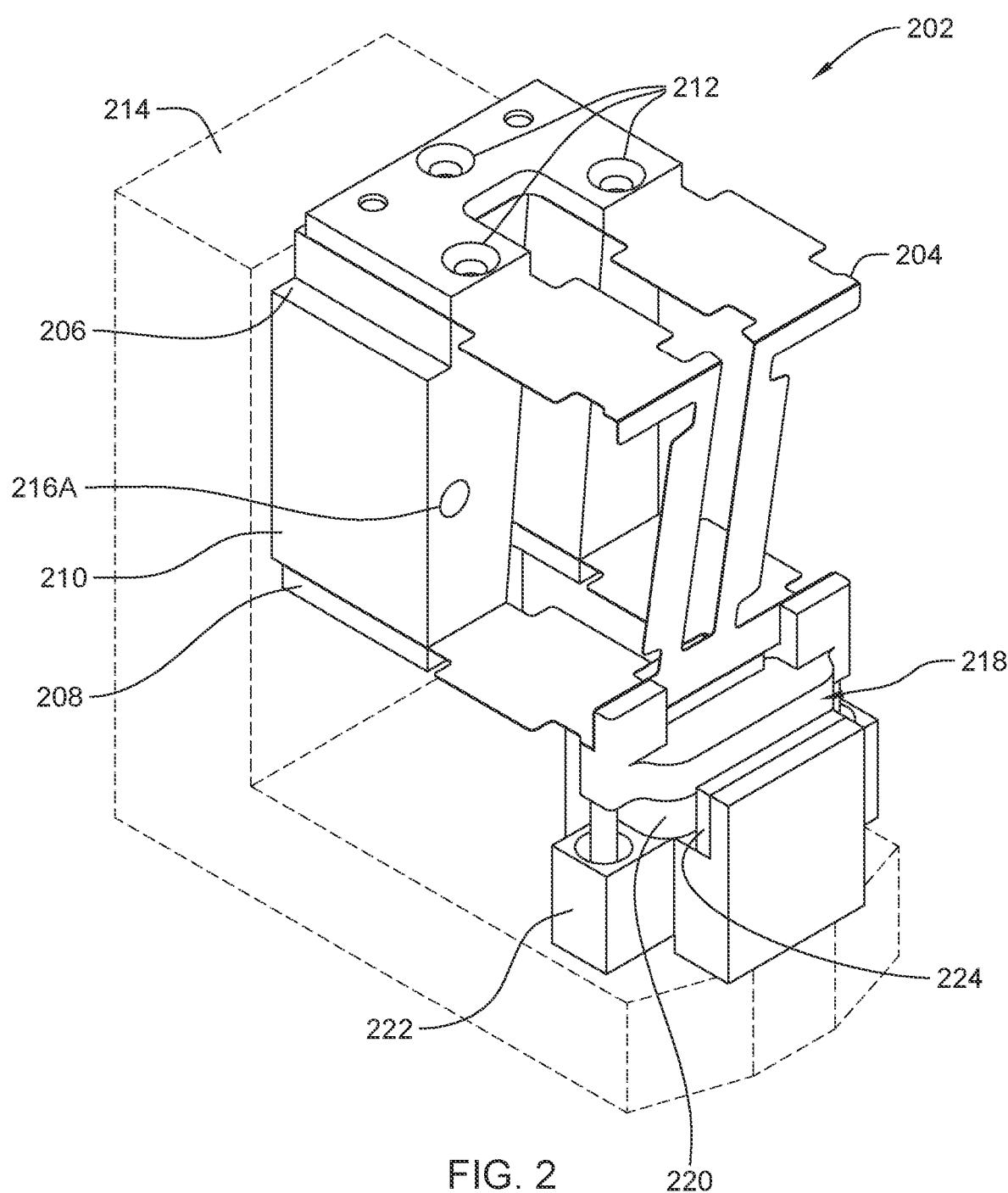
FIG. 2 depicts a three-dimensional view of an example of a reworkable tape track following actuator assembly with a spring actuator compatible with a ten-degree head rotation, in accordance with an embodiment of the present invention.

FIG. 2 depicts a three-dimensional view of an example of a reworkable tape track following actuator assembly with a spring actuator compatible with a ten-degree head rotation, in accordance with an embodiment of the present invention. In this embodiment, reworkable tape track following actuator assembly 202 includes spring actuator 204 folded into a C-shape and includes a ten-degree offset. Spring actuator 104 includes a first bend between a top section and a middle section and a second bend between a middle section and a bottom section. Spring actuator 204 is installed on reworkable tape track following actuator assembly 202 that includes top plate 206, bottom plate 208, and middle block 210, where a cabled head assembly is not disposed in spring actuator 204 for illustrative purposes. Rework tape track following actuator assembly 202 with disposed cabled head assembly in spring actuator 204 is discussed in further detail with regards to FIG. 10. A portion of a top section of spring actuator 204 is disposed between a bottom surface of top plate 206 and a top surface of middle block 210. A portion of a bottom section of spring actuator 204 is disposed between a top surface of bottom plate 208 and a bottom surface of middle block 210. Top plate 206 and bottom plate 208 each have a U-shaped cut out for placement of the cabled head assembly when disposed in a cavity of the top section, the middle section, and the bottom section, of spring actuator 204.

In this embodiment, top plate 206 includes three holes 212 for placement of three fasteners (e.g., screw, bolt) to secure the portion of the top section of spring actuator 204 between top plate 106 and middle block 210, where each of the three fasteners pass through a respective through hole of the top section of spring actuator 204. The three holes 212 of top plate 206 are countersunk, where a tapered fastener is disposed in each of the three holes 212 (not illustrated in FIG. 2) and a top head portion of each tapered fastener is on a similar planar surface as a top surface of top plate 206. In other embodiments, a number of holes 212 and a placement of holes 212 can vary depending on the mounting requirements for spring actuator 204.

In this embodiment, bottom plate 208 includes three holes (not visible in FIG. 2) for placement of three fasteners to secure the portion of the bottom section of spring actuator 204 between bottom plate 208 and middle block 210, where each of the three fasteners pass through a respective through hole of the bottom section of spring actuator 204. The three holes of bottom plate 208 are countersunk, where a tapered fastener is disposed in each of the three holes (not illustrated in FIG. 2) and a top head portion of each tapered fastener is on a similar planar surface as a bottom surface of bottom plate 208. In other embodiments, similar to holes 212 of the top section of spring actuator 204, a number of holes in bottom plate 208 and a placement of the holes in bottom plate 208 can vary depending on the mounting requirements for spring actuator 204. Middle block 210 is mounted on fixture 214 for illustrative purposes and does not represent a portion of a tape drive assembly to which middle block 210 of the actuator assembly is mounted. Middle block 210 includes two block through holes, including block through hole 216A visible in FIG. 2, for placement of a fastener for mounting the actuator assembly with respect to an actuator body in tape drive assembly. Further discussion of the through holes of middle block 210 is provided with regards to FIG. 12.

As previously mentioned, for illustrative purposes a cabled head assembly is not disposed in a cable slot of spring actuator 204 of reworkable tape track following actuator assembly 202. Coil assembly 218 with voice coil 220 is positioned between base 222 that includes magnet 224 positioned on one side of voice coil 220 and additional magnets (not illustrated in FIG. 2) positioned on another side of voice coil 220 opposite magnet 224. Base 222 is attachable to the tape drive assembly or integrated into the tape drive assembly. Coil assembly 218 is positioned beneath a bottom section of spring actuator 204. In this embodiment, an orientation of voice coil 220 is horizontal and perpendicular to a placement of the cabled head assembly in spring actuator 204.

Figure 3:
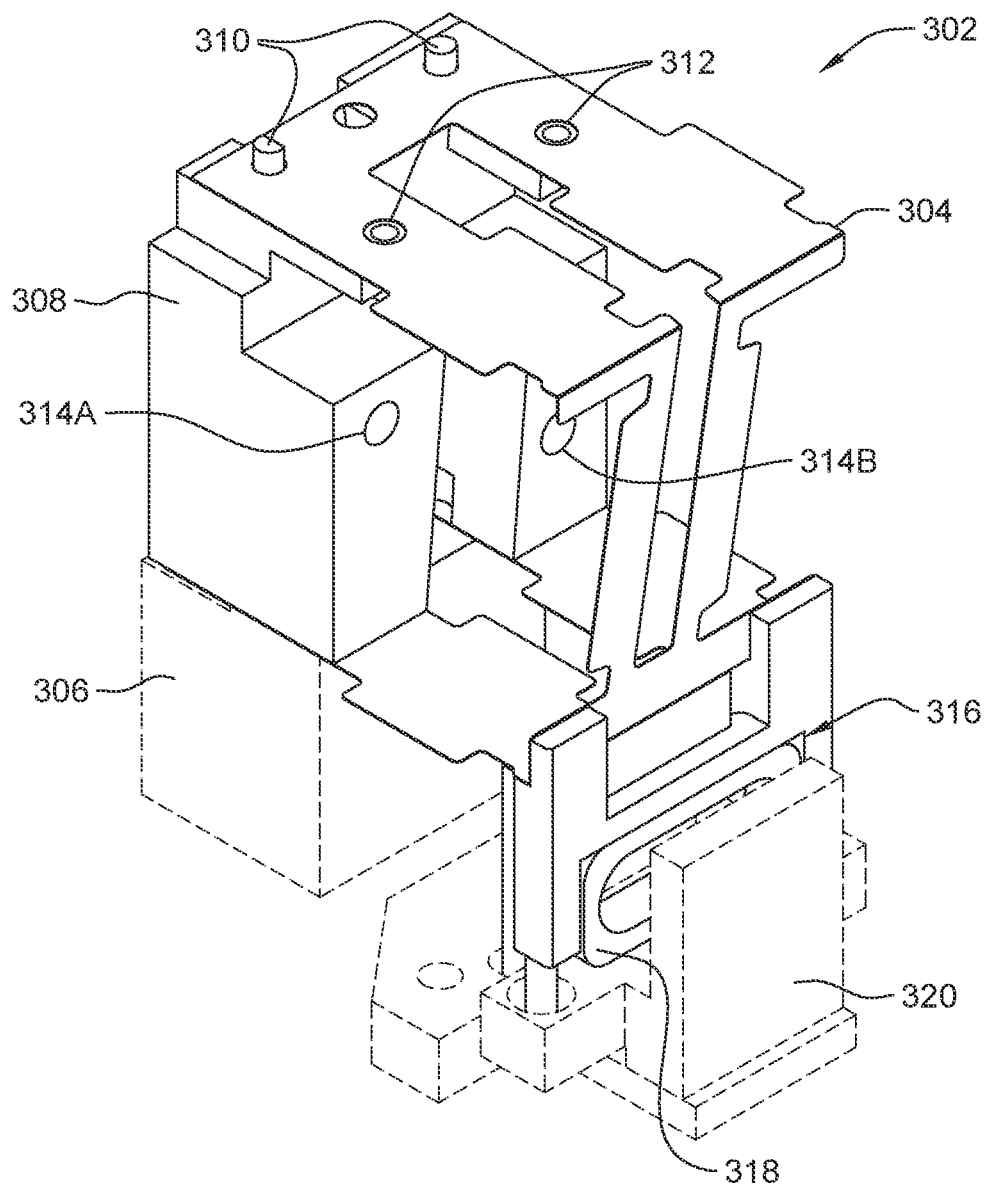
FIG. 3 depicts a three-dimensional view of another example of a reworkable tape track following actuator assembly with a spring actuator compatible with a ten-degree head rotation, in accordance with an embodiment of the present invention.

FIG. 3 depicts a three-dimensional view of another example of a reworkable tape track following actuator assembly with a spring actuator compatible with a ten-degree head rotation, in accordance with an embodiment of the present invention. In this embodiment, reworkable tape track following actuator assembly 302 includes spring actuator 304 folded into a C-shape and includes a ten-degree offset. Spring actuator 104 includes a first bend between a top section and a middle section and a second bend between a middle section and a bottom section. Spring actuator 304 is installed on reworkable tape track following actuator assembly 302 that includes top plate (not illustrated in FIG. 3), bottom base 306, and block 308, where a cabled head assembly is not disposed in spring actuator 304 for illustrative purposes. Rework tape track following actuator assembly 302 with disposed cabled head assembly in spring actuator 304 is discussed in further detail with regards to FIG. 16. A portion of a top section of spring actuator 304 is disposed between a bottom surface of a top portion and a top surface of block 308. Alignment pins 310 protrude from the top surface of block 308, where each of alignment pins 310 pass through corresponding holes in the top section of spring actuator 304. A portion of a bottom section of spring actuator 304 is disposed between a top surface of bottom base 306 and a bottom surface of block 308.

In this embodiment, the top section of spring actuator 304 includes two holes 312 for placement of two fasteners (e.g., screw, bolt) to secure spring actuator 304 between the top plate and block 308, where each of the two fasteners pass through a respective through hole of the top plate. Similar to the top plates discussed with regards to FIGS. 1 and 2, the two holes of the top plate are countersunk, where a tapered fastener is disposed in each of the two holes (not illustrated in FIG. 3) and a top head portion of each tapered fastener is on a similar planar surface as a top surface of the top plate. In other embodiments, a number of holes 312 and a placement of holes 312 can vary depending on the mounting requirements for spring actuator 304.

In this embodiment, bottom base 306 includes three holes (not visible in FIG. 3) for placement of fasteners to secure the portion of the bottom section of spring actuator 304 between bottom base 306 and block 308, where each of the fasteners pass through a respective through hole of the bottom section of spring actuator 304. The holes of bottom base 306 can be countersunk, where a tapered fastener is disposed in each of the three holes (not illustrated in FIG. 3) and a top head portion of each tapered fastener is on a similar planar surface as a bottom surface of bottom base 306. In other embodiments, similar to holes 312 of the top section of spring actuator 304, a number of holes in bottom base 306 and a placement of the holes in bottom base 306 can vary depending on the mounting requirements for spring actuator 304. Block 308 includes block through hole 314A and 314B for placement of a fastener for mounting the actuator assembly with respect to an actuator body in the tape drive assembly.

As previously mentioned, for illustrative purposes a cabled head assembly is not disposed in a cable slot of spring actuator 304 of reworkable tape track following actuator assembly 302. Coil assembly 316 with voice coil 318 is positioned between base 320, where base 320 is attachable to the tape drive assembly or integrated into the tape drive assembly. Though not illustrated in FIG. 3, at least two magnets would be positioned on opposite sides of voice coil 318. Coil assembly 316 is positioned beneath a bottom section of spring actuator 304. In this embodiment, an orientation of voice coil 318 is vertical and in perpendicular to a placement of the cabled head assembly in spring actuator 304.

FIG. 4 depicts a three-dimensional view of an example of a reworkable tape track following actuator assembly from FIG. 1 with an installed cabled head assembly, in accordance with an embodiment of the present invention. In this embodiment, reworkable tape track following actuator assembly 102 includes spring actuator 104 folded into a C-shape and includes a zero-degree offset, where cabled head assembly 402 is disposed in spring actuator 104. Cabled head assembly 402 includes cabled head module 404 and flex cables 406, where cabled head module 404 is glued utilizing an adhesive between two middle stiffener wings of a middle section of spring actuator 104. An orientation of voice coil 120 between magnets 124 of coil assembly 118 is vertical and in parallel with a placement of cabled head module 404 of cabled head assembly 402 in spring actuator 104. In this embodiment, a position of cabled head module 404 is at a zero-degree skew equally a zero-degree skew of spring actuator 104.

Figure 5:
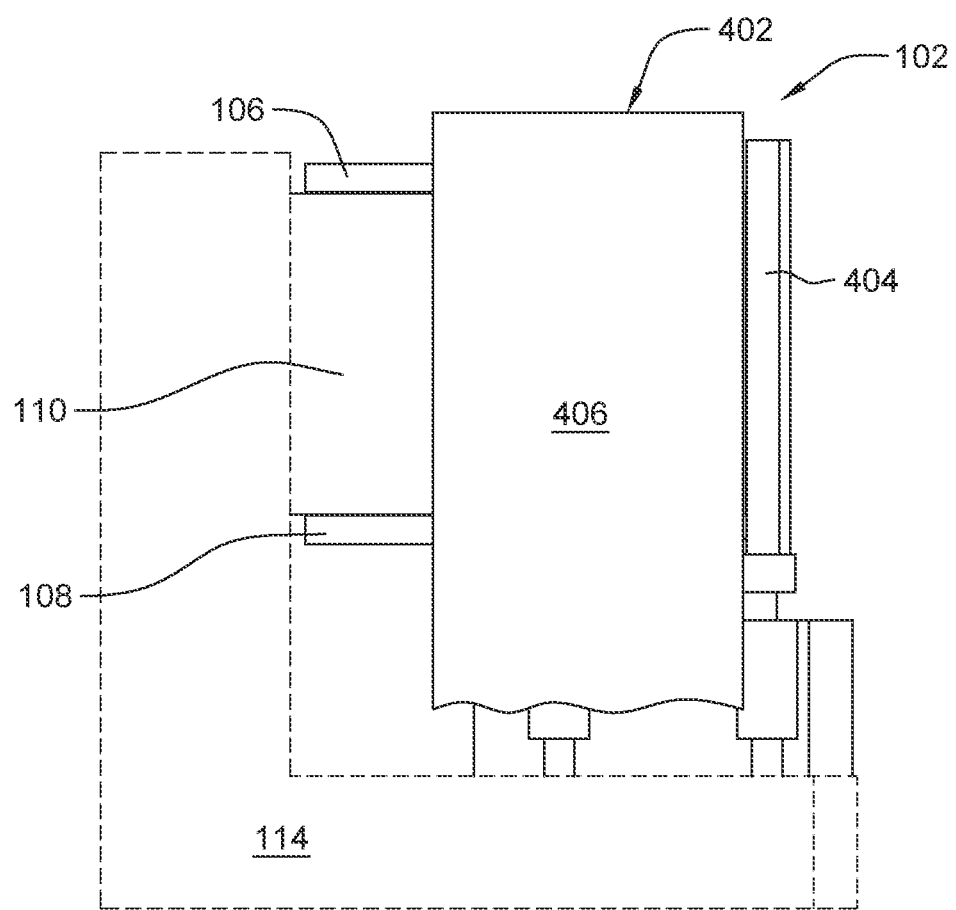
FIG. 5 depicts a side view of an example of a reworkable tape track following actuator assembly from FIG. 1 with an installed cabled head assembly, in accordance with an embodiment of the present invention.

FIG. 5 depicts a side view of an example of a reworkable tape track following actuator assembly from FIG. 1 with an installed cabled head assembly, in accordance with an embodiment of the present invention. As previously mentioned, fixture 114 is for illustrative purposes and does not represent a portion of the tape drive assembly to which middle block 110 of reworkable tape track following actuator assembly 102 is mounted. In the side view, top plate 106, bottom plate 108, and middle block 110 is visible, where a width of each of top plate 106, bottom plate 108, and middle block 110 is such to provide clearance to between a mounting area of the tape drive assembly and flex cables 406 of cabled head assembly 402 that includes cabled head module 404.

Figure 6:
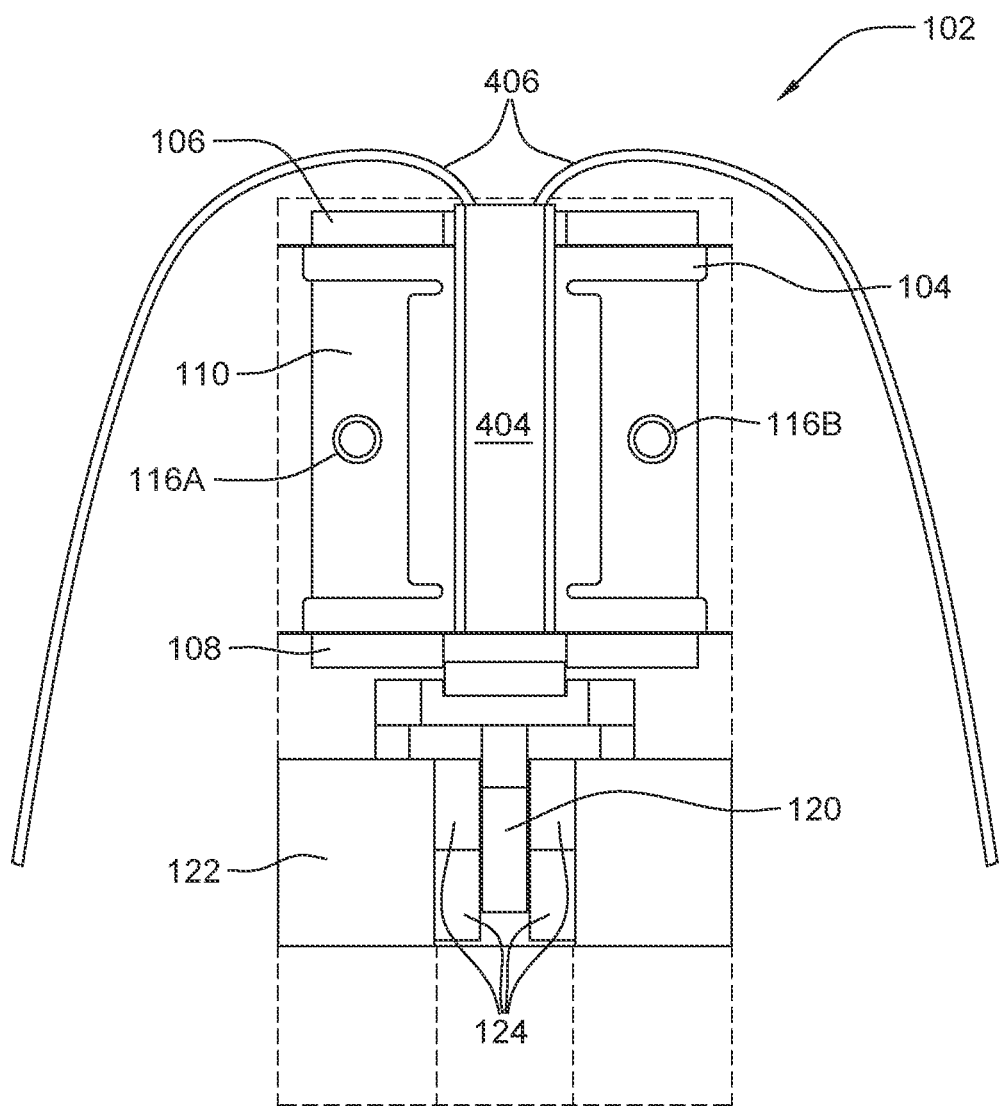
FIG. 6 depicts a front view of an example of a reworkable tape track following actuator assembly from FIG. 1 with an installed cabled head assembly, in accordance with an embodiment of the present invention.

FIG. 6 depicts a front view of an example of a reworkable tape track following actuator assembly from FIG. 1 with an installed cabled head assembly, in accordance with an embodiment of the present invention. In the front view of reworkable tape track following actuator assembly 102, middle block 110 between top plate 106 and bottom plate 108 is visible, where middle block 110 includes a left block through hole 116A and a right block through hole 116B for mounting reworkable tape track following actuator assembly 102 to the tape drive assembly. Block through hole 116A and 116B each allow for placements of a fastener for securing reworkable tape track following actuator assembly 102 to the tape drive assembly. The fasteners of middle block 110 result in the reworkable aspect of the invention, since reworkable tape track following actuator assembly 102 can be removed from the tape drive assembly, reworked, and then reinstalled back on the tape drive assembly. The vertical placement and parallel alignment of voice coil 120 with respect to cabled head module 404 is visible, where voice coil 120 is disposed between magnets 124 of base 122.

Figure 7:
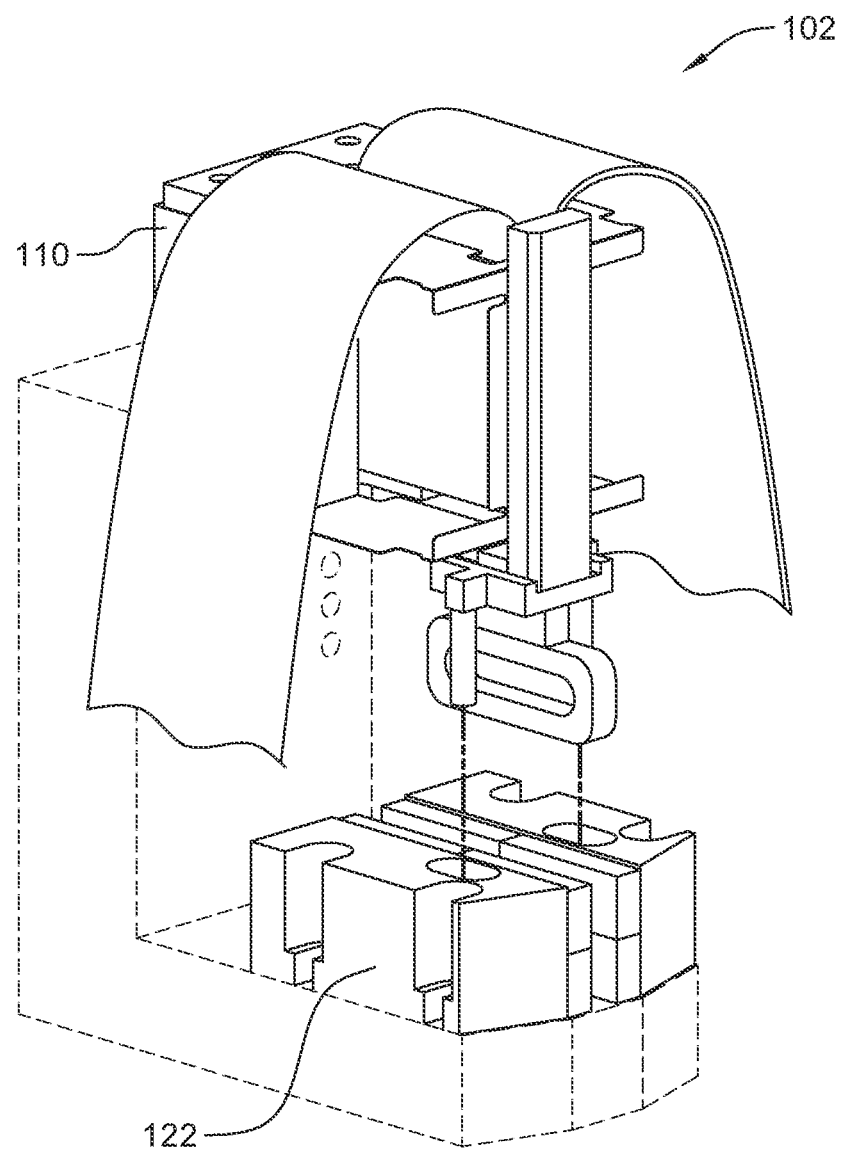
FIG. 7 depicts a three-dimensional view of an example of a reworkable tape track following actuator assembly from FIG. 1 with an installed cabled head assembly aligned with a base, in accordance with an embodiment of the present invention.

FIG. 7 depicts a three-dimensional view of an example of a reworkable tape track following actuator assembly from FIG. 1 with an installed cabled head assembly aligned with a base, in accordance with an embodiment of the present invention. Upon removal of the fasteners from the corresponding block through hole 116A and 116B (not visible in FIG. 7) from middle block 110, reworkable tape track following actuator assembly 102 is lifted vertically in an upward direction and out of base 122.

Figure 8:
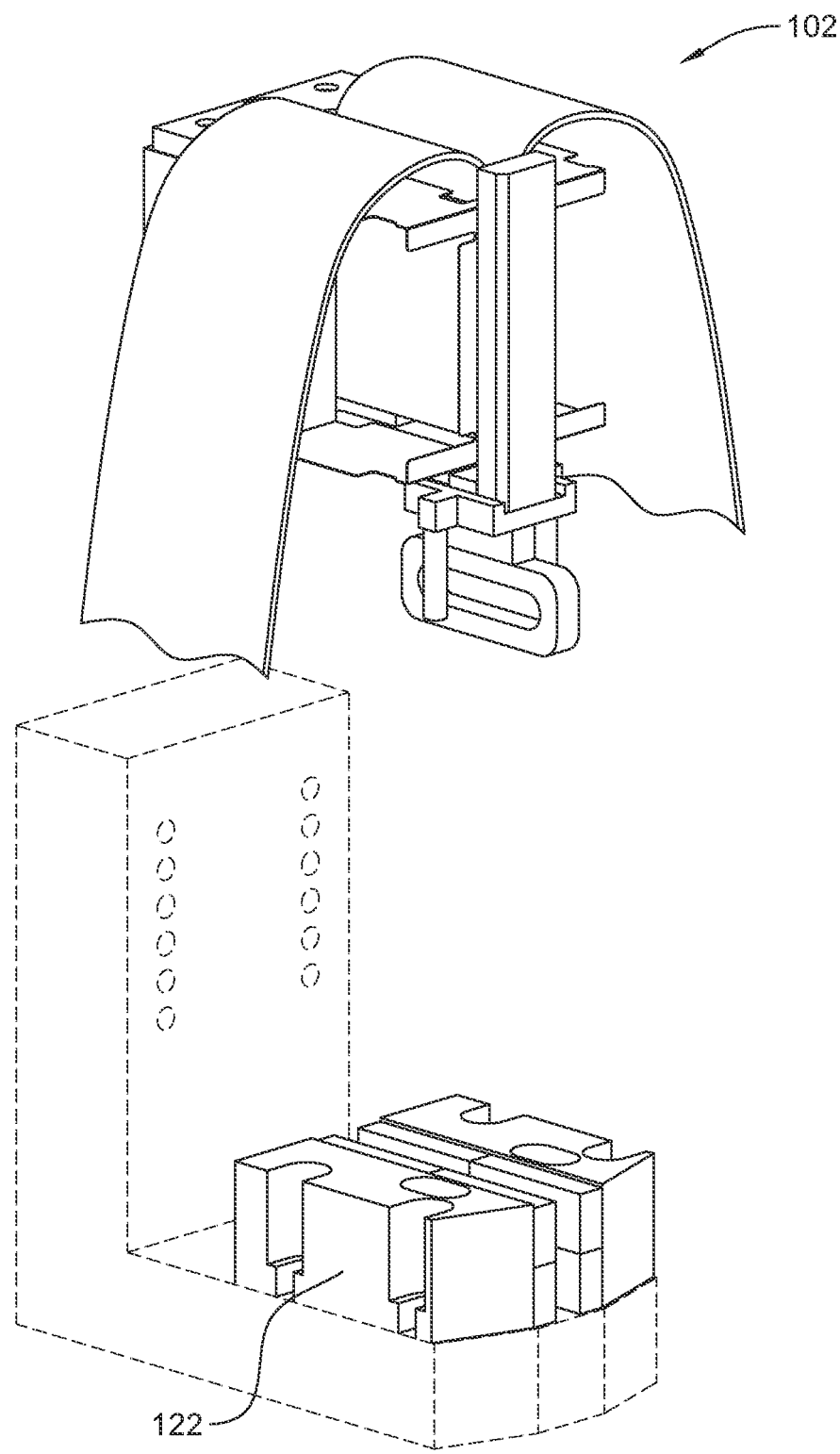
FIG. 8 depicts a three-dimensional view of an example of a reworkable tape track following actuator assembly from FIG. 1 with an installed cabled head assembly being removed from a base, in accordance with an embodiment of the present invention.

FIG. 8 depicts a three-dimensional view of an example of a reworkable tape track following actuator assembly from FIG. 1 with an installed cabled head assembly being removed from a base, in accordance with an embodiment of the present invention. Upon reworkable tape track following actuator assembly 102 clearing base 122 during the vertical lifting in the upward direction, reworkable tape track following actuator assembly 102 is removed and any reworking or replacing of reworkable tape track following actuator assembly 102 can be performed.

Figure 9:
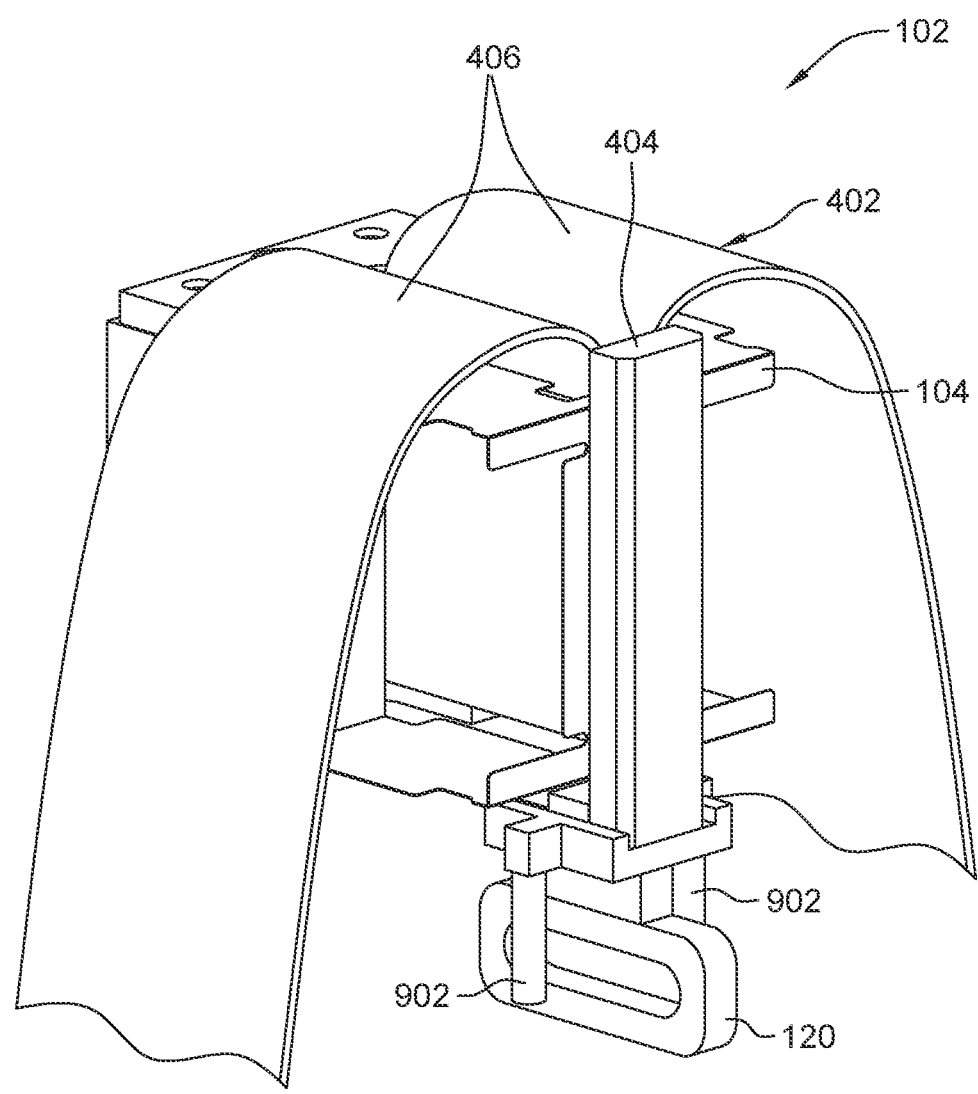
FIG. 9 depicts a three-dimensional view of an example of a reworkable tape track following actuator assembly from FIG. 1 with an installed cabled head assembly removed from a base, in accordance with an embodiment of the present invention.

FIG. 9 depicts a three-dimensional view of an example of a reworkable tape track following actuator assembly from FIG. 1 with an installed cabled head assembly removed from a base, in accordance with an embodiment of the present invention. As previously discussed, reworkable tape track following actuator assembly 102 includes spring actuator 104 folded into a C-shape and includes a zero-degree offset, where cabled head assembly 402 is disposed in spring actuator 104. Cabled head assembly 402 includes cabled head module 404 and flex cables 406, where cabled head module 404 is glued between two middle stiffener wings of a middle section of spring actuator 104. Voice coil 120 remains with reworkable tape track following actuator assembly 102 subsequent to removal from base 122 (not illustrated in FIG. 9). Pins 902 on either side of voice coil 120 of reworkable tape track following actuator assembly 102 are also now visible subsequent to removal from base 122.

Figure 10:
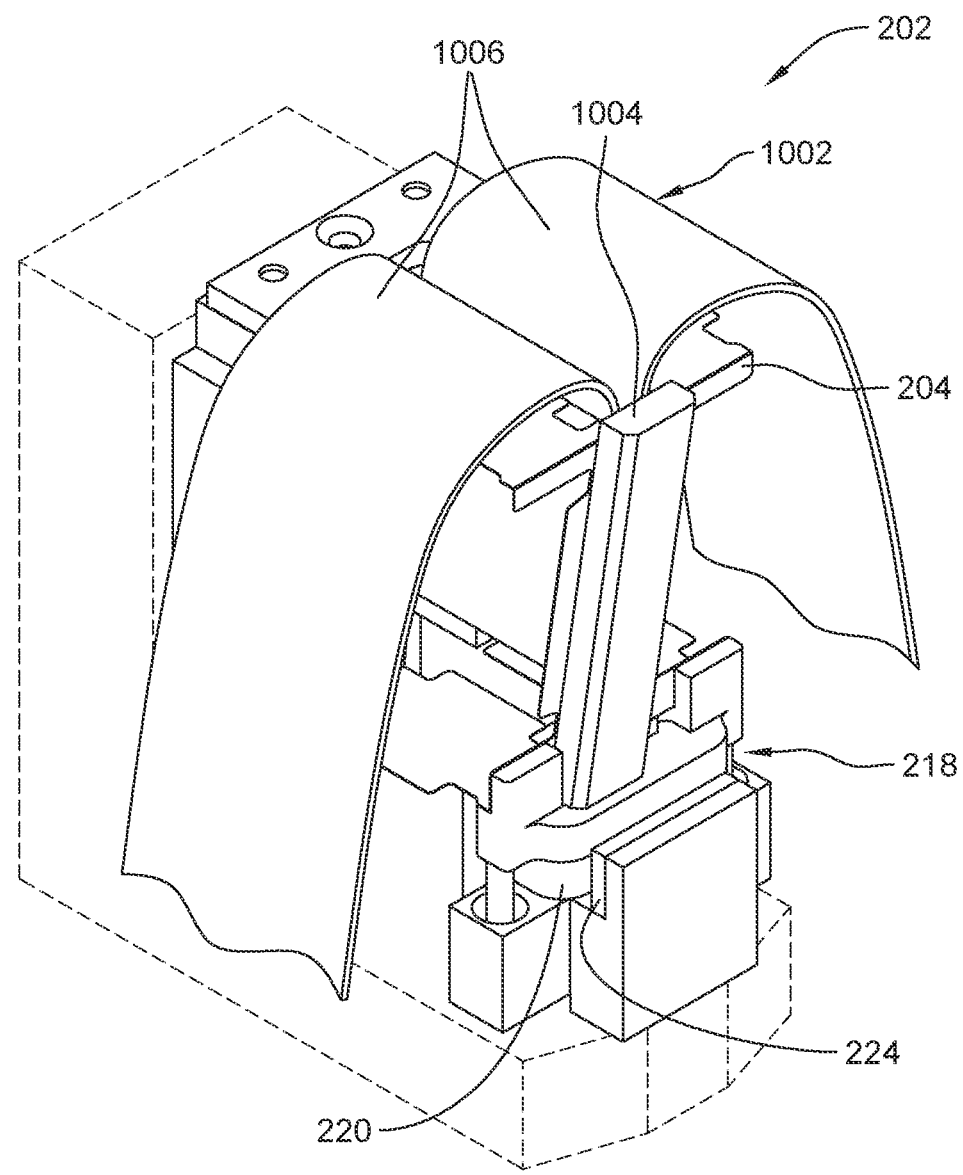
FIG. 10 depicts a three-dimensional view of an example of a reworkable tape track following actuator assembly from FIG. 2 with an installed cabled head assembly, in accordance with an embodiment of the present invention.

FIG. 10 depicts a three-dimensional view of an example of a reworkable tape track following actuator assembly from FIG. 2 with an installed cabled head assembly, in accordance with an embodiment of the present invention. In this embodiment, reworkable tape track following actuator assembly 102 includes spring actuator 104 folded into a C-shape and includes a ten-degree offset, where cabled head assembly 1002 is disposed in spring actuator 204. Cabled head assembly 1002 includes cabled head module 1004 and flex cables 1006, where cabled head module 1004 is glued between two middle stiffener wings of a middle section of spring actuator 204. An orientation of voice coil 220 between magnets 224 of coil assembly 218 is horizontal and perpendicular to a placement of cabled head module 1004 of cabled head assembly 1002 in spring actuator 204. In this embodiment, a position of cabled head module 1004 is at a ten-degree skew equal to a ten-degree skew of spring actuator 204. It is to be noted, a skew of cabled head module and a skew of spring actuator 204 can be an amount greater than zero.

Figure 11:
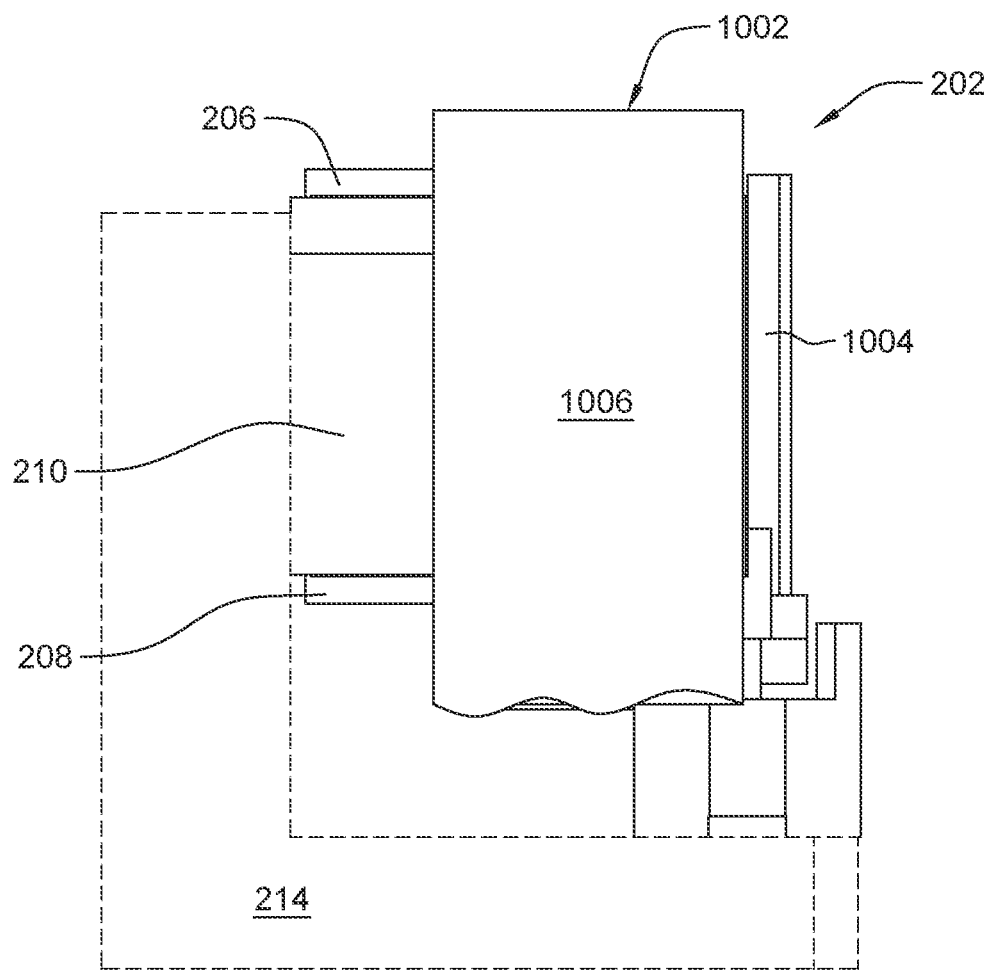
FIG. 11 depicts a side view of an example of a reworkable tape track following actuator assembly from FIG. 2 with an installed cabled head assembly, in accordance with an embodiment of the present invention.

FIG. 11 depicts a side view of an example of a reworkable tape track following actuator assembly from FIG. 2 with an installed cabled head assembly, in accordance with an embodiment of the present invention. As previously mentioned, fixture 214 is for illustrative purposes and does not represent a portion of the tape drive assembly to which middle block 210 of reworkable tape track following actuator assembly 202 is mounted. In the side view, top plate 206, bottom plate 208, and middle block 210 is visible, where a width of each of top plate 206, bottom plate 208, and middle block 210 is such to provide clearance to between a mounting area of the tape drive assembly and flex cables 1006 of cabled head assembly 1002 that includes cabled head module 1004.

Figure 12:
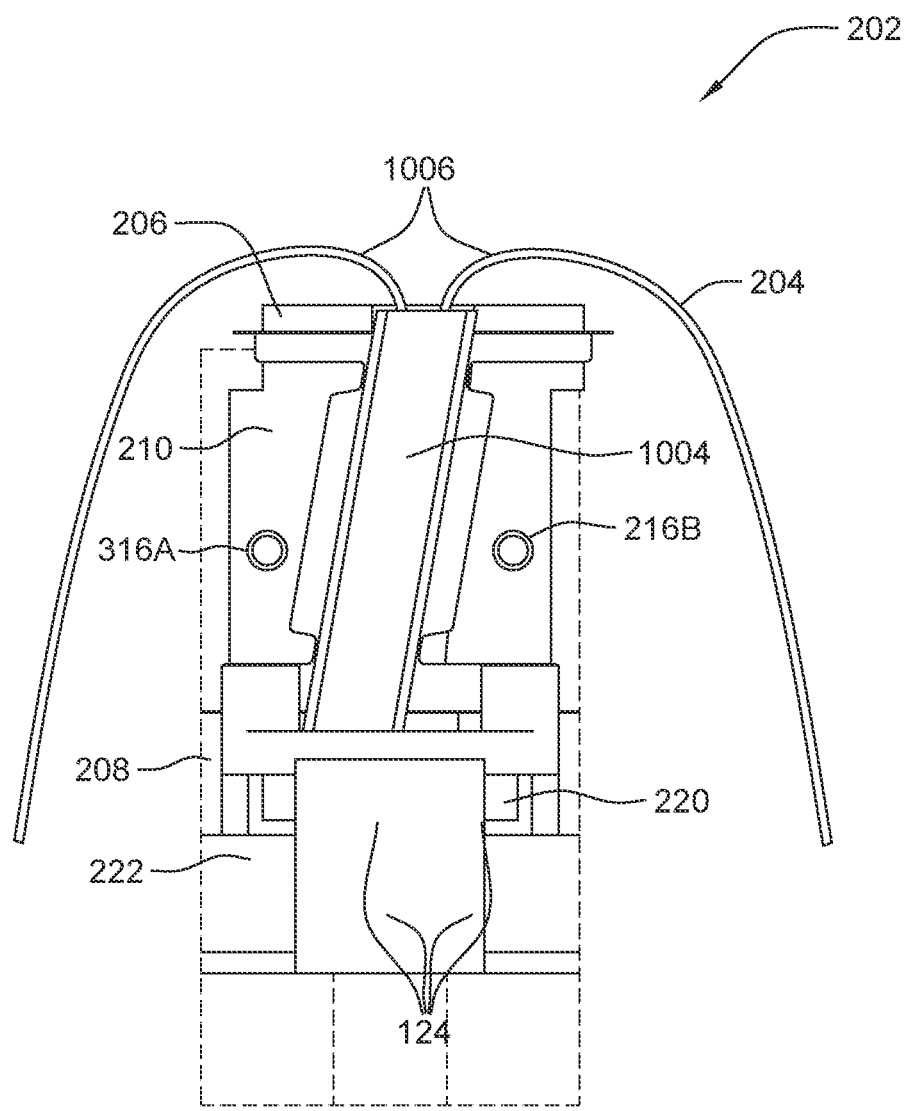
FIG. 12 depicts a front view of an example of a reworkable tape track following actuator assembly from FIG. 2 with an installed cabled head assembly, in accordance with an embodiment of the present invention.

FIG. 12 depicts a front view of an example of a reworkable tape track following actuator assembly from FIG. 2 with an installed cabled head assembly, in accordance with an embodiment of the present invention. In the front view of reworkable tape track following actuator assembly 202, middle block 210 between top plate 206 and bottom plate 208 is visible, where middle block 210 includes a left block through hole 216A and a right block through hole 216B for mounting reworkable tape track following actuator assembly 202 to the tape drive assembly. Block through hole 216A and 216B each allow for placements of a fastener for securing reworkable tape track following actuator assembly 202 to the tape drive assembly. The fasteners of middle block 210 result in the reworkable aspect of the invention, since reworkable tape track following actuator assembly 202 can be removed from the tape drive assembly, reworked, and then reinstalled back on the tape drive assembly. The vertical placement and parallel alignment of voice coil 220 with respect to cabled head module 1004 is visible, where voice coil 220 is disposed between magnets 224 (not visible in FIG. 12) of base 222.

Figure 13:
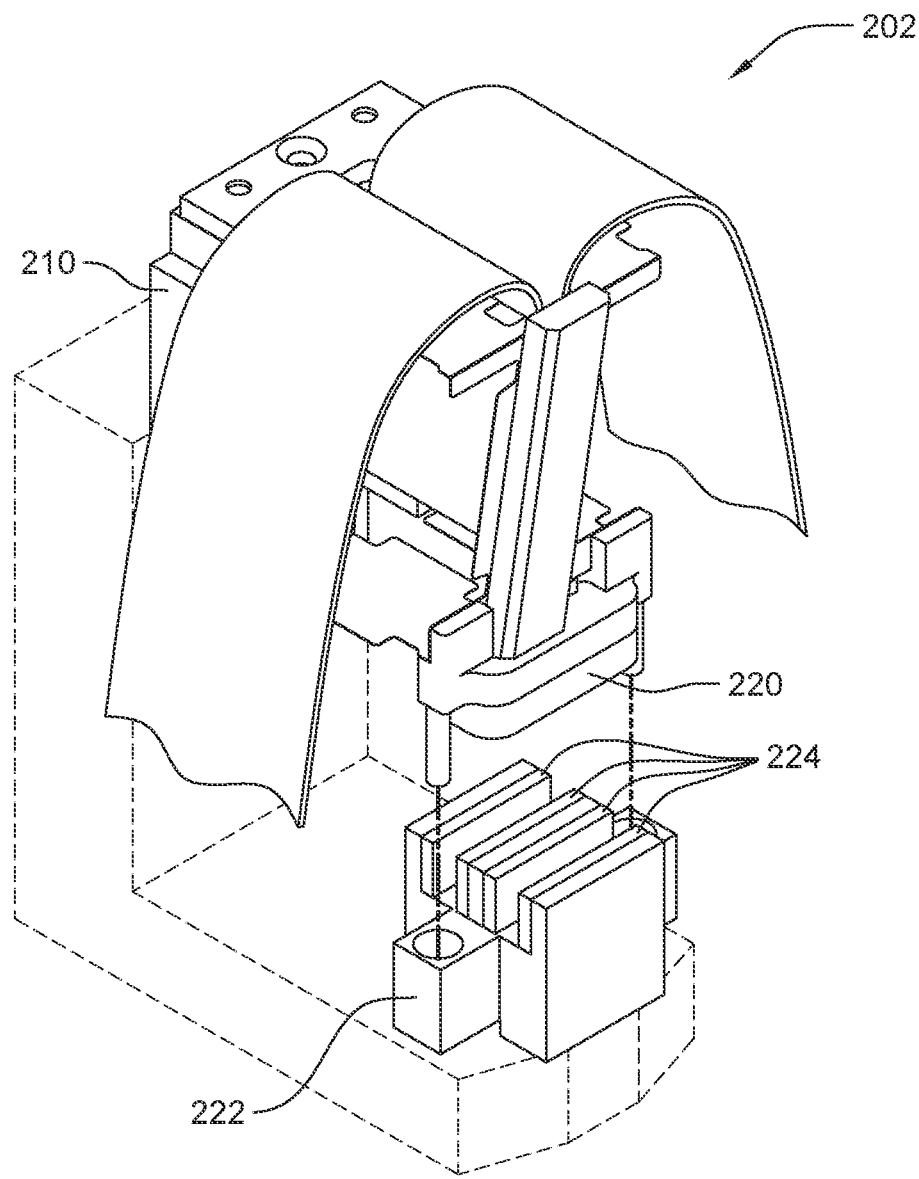
FIG. 13 depicts a three-dimensional view of an example of a reworkable tape track following actuator assembly from FIG. 2 with an installed cabled head assembly aligned with a base, in accordance with an embodiment of the present invention.

FIG. 13 depicts a three-dimensional view of an example of a reworkable tape track following actuator assembly from FIG. 2 with an installed cabled head assembly aligned with a base, in accordance with an embodiment of the present invention. Upon removal of the fasteners from the corresponding block through hole 216A and 216B (not visible in FIG. 13) from middle block 210, reworkable tape track following actuator assembly 202 is lifted vertically in an upward direction and out of base 222. Multiple magnets 224 are positioned in base 222 for voice coil 220 are viewable with the lifting of reworkable tape track following actuator assembly 202. A first set of two magnets 224 straddle one portion of voice coil 220, where the portion of voice coil 220 is suspended between the first set of two magnets 224. A second set of two magnets 224 straddle another portion of voice coil 220, where the other portion of voice coil 220 is suspended between the second set of two magnets 224.

Figure 14:
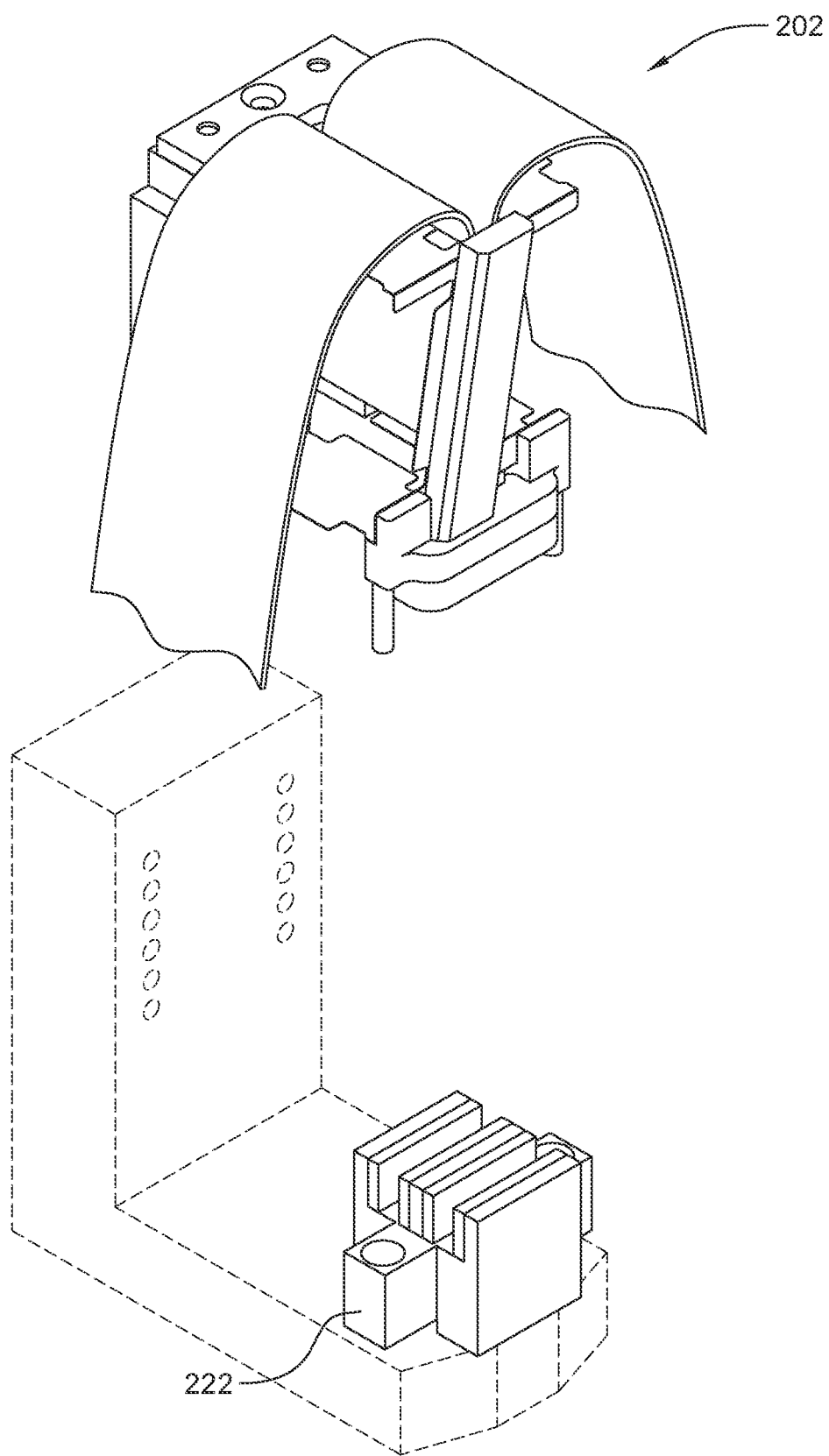
FIG. 14 depicts a three-dimensional view of an example of a reworkable tape track following actuator assembly from FIG. 2 with an installed cabled head assembly being removed from a base, in accordance with an embodiment of the present invention.

FIG. 14 depicts a three-dimensional view of an example of a reworkable tape track following actuator assembly from FIG. 2 with an installed cabled head assembly being removed from a base, in accordance with an embodiment of the present invention. Upon reworkable tape track following actuator assembly 202 clearing base 222 during the vertical lifting in the upward direction, reworkable tape track following actuator assembly 202 is removed and any reworking or replacing of reworkable tape track following actuator assembly 202 can be performed.

Figure 15:
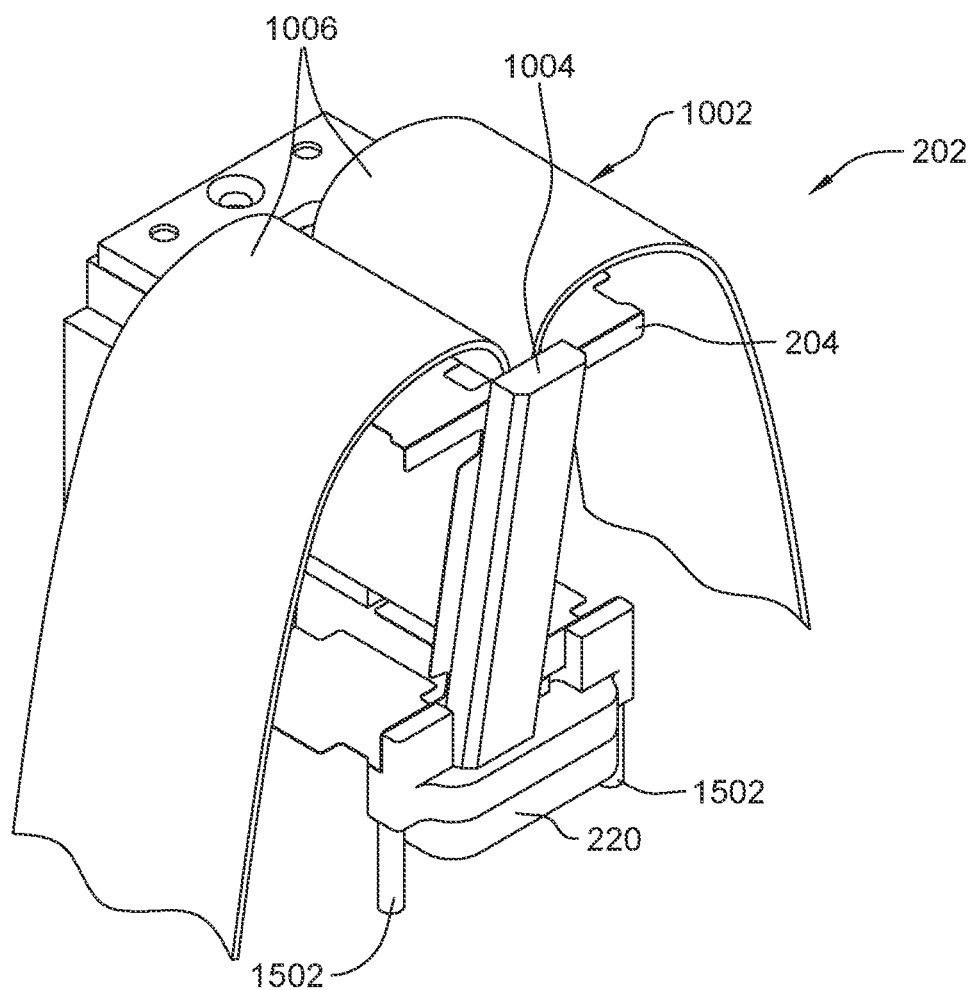
FIG. 15 depicts a three-dimensional view of an example of a reworkable tape track following actuator assembly from FIG. 2 with an installed cabled head assembly removed from a base, in accordance with an embodiment of the present invention.

FIG. 15 depicts a three-dimensional view of an example of a reworkable tape track following actuator assembly from FIG. 2 with an installed cabled head assembly removed from a base, in accordance with an embodiment of the present invention. As previously discussed, reworkable tape track following actuator assembly 202 includes spring actuator 204 folded into a C-shape and includes a ten-degree offset, where cabled head assembly 1002 is disposed in spring actuator 204. Cabled head assembly 1002 includes cabled head module 1004 and flex cables 1006, where cabled head module 1004 is glued utilizing an adhesive between two middle stiffener wings of a middle section of spring actuator 204. Voice coil 220 remains with reworkable tape track following actuator assembly 102 subsequent to removal from base 222 (not illustrated in FIG. 15). Pins 1502 on either side of voice coil 220 of reworkable tape track following actuator assembly 202 are also now visible subsequent to removal from base 222.

Figure 16:
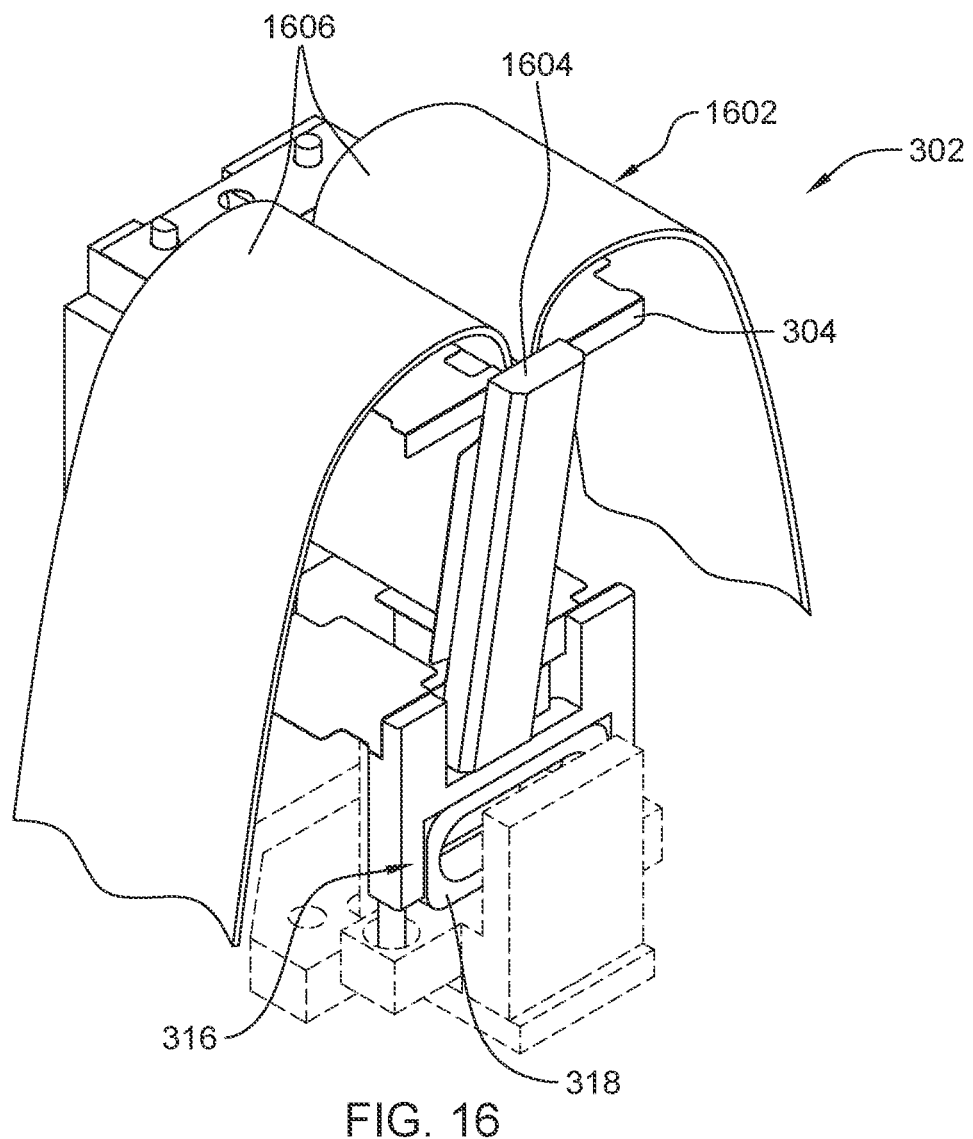
FIG. 16 depicts a three-dimensional view of an example of a reworkable tape track following actuator assembly from FIG. 3 with an installed cabled head assembly, in accordance with an embodiment of the present invention.

FIG. 16 depicts a three-dimensional view of an example of a reworkable tape track following actuator assembly from FIG. 3 with an installed cabled head assembly, in accordance with an embodiment of the present invention. In this embodiment, reworkable tape track following actuator assembly 302 includes spring actuator 304 folded into a C-shape and includes a ten-degree offset, where cabled head assembly 1602 is disposed in spring actuator 304. Cabled head assembly 1602 includes cabled head module 1604 and flex cables 1606, where cabled head module 1604 is glued utilizing an adhesive between two middle stiffener wings of a middle section of spring actuator 304. An orientation of voice coil 318 between magnets (not illustrated in FIG. 16) of coil assembly 118 is vertical and perpendicular to a placement of cabled head module 1604 of cabled head assembly 1602 in spring actuator 304. In this embodiment, a position of cabled head module 1604 is at a ten-degree skew equal to a ten-degree skew of spring actuator 304.

Figure 17:
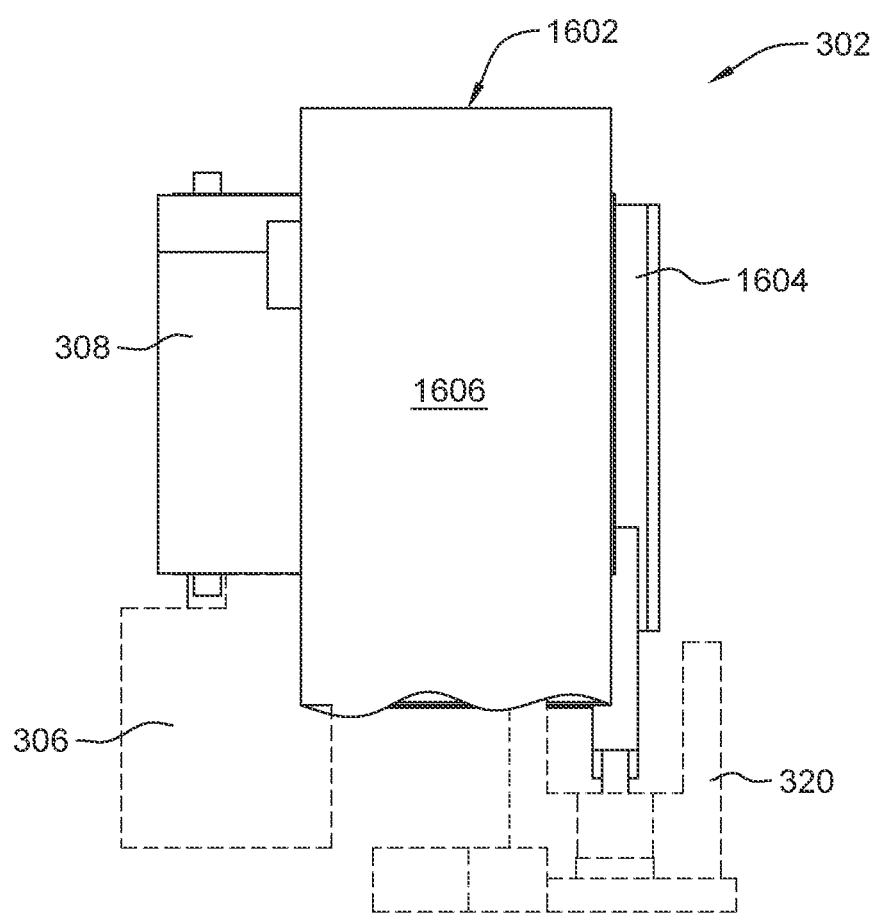
FIG. 17 depicts a side view of an example of a reworkable tape track following actuator assembly from FIG. 3 with an installed cabled head assembly, in accordance with an embodiment of the present invention.

FIG. 17 depicts a side view of an example of a reworkable tape track following actuator assembly from FIG. 3 with an installed cabled head assembly, in accordance with an embodiment of the present invention. As previously mentioned, bottom base 306 is for illustrative purposes and does not represent a portion of the tape drive assembly to which block 308 of reworkable tape track following actuator assembly 302 is mounted. In the side view, flex cables 1606 of cabled head assembly 1602 with cabled head module 1604 is visible with respect to base 320.

Figure 18:
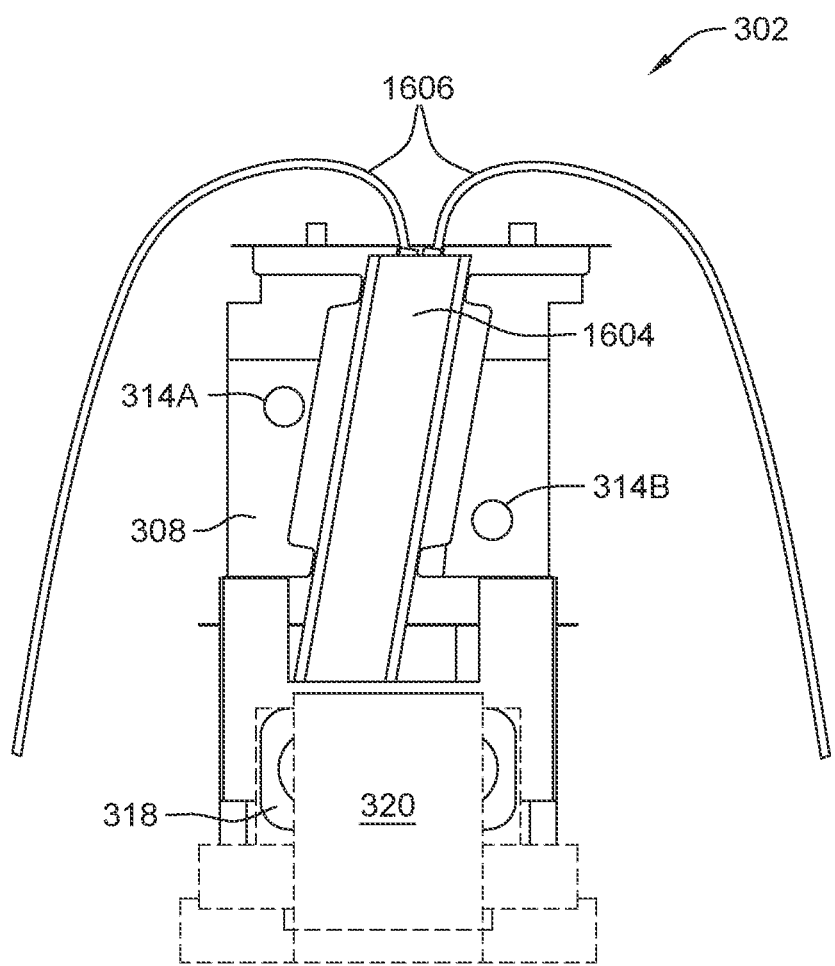
FIG. 18 depicts a front view of an example of a reworkable tape track following actuator assembly from FIG. 3 with an installed cabled head assembly, in accordance with an embodiment of the present invention.

FIG. 18 depicts a front view of an example of a reworkable tape track following actuator assembly from FIG. 3 with an installed cabled head assembly, in accordance with an embodiment of the present invention. In the front view of reworkable tape track following actuator assembly 302, block 308 is visible, where block 308 includes a left block through hole 314A and a right block through hole 314B for mounting reworkable tape track following actuator assembly 302 to the tape drive assembly. Block through hole 314A and 314B each allow for placements of a fastener for securing reworkable tape track following actuator assembly 302 to the tape drive assembly. The fasteners of block 308 result in the reworkable aspect of the invention, since reworkable tape track following actuator assembly 302 can be removed from the tape drive assembly, reworked, and then reinstalled back on the tape drive assembly. The vertical placement and perpendicular alignment of voice coil 318 with respect to cabled head module 1604 is visible, where voice coil 318 is disposed between magnets (not illustrated in FIG. 18) of base 320.

Figure 19:
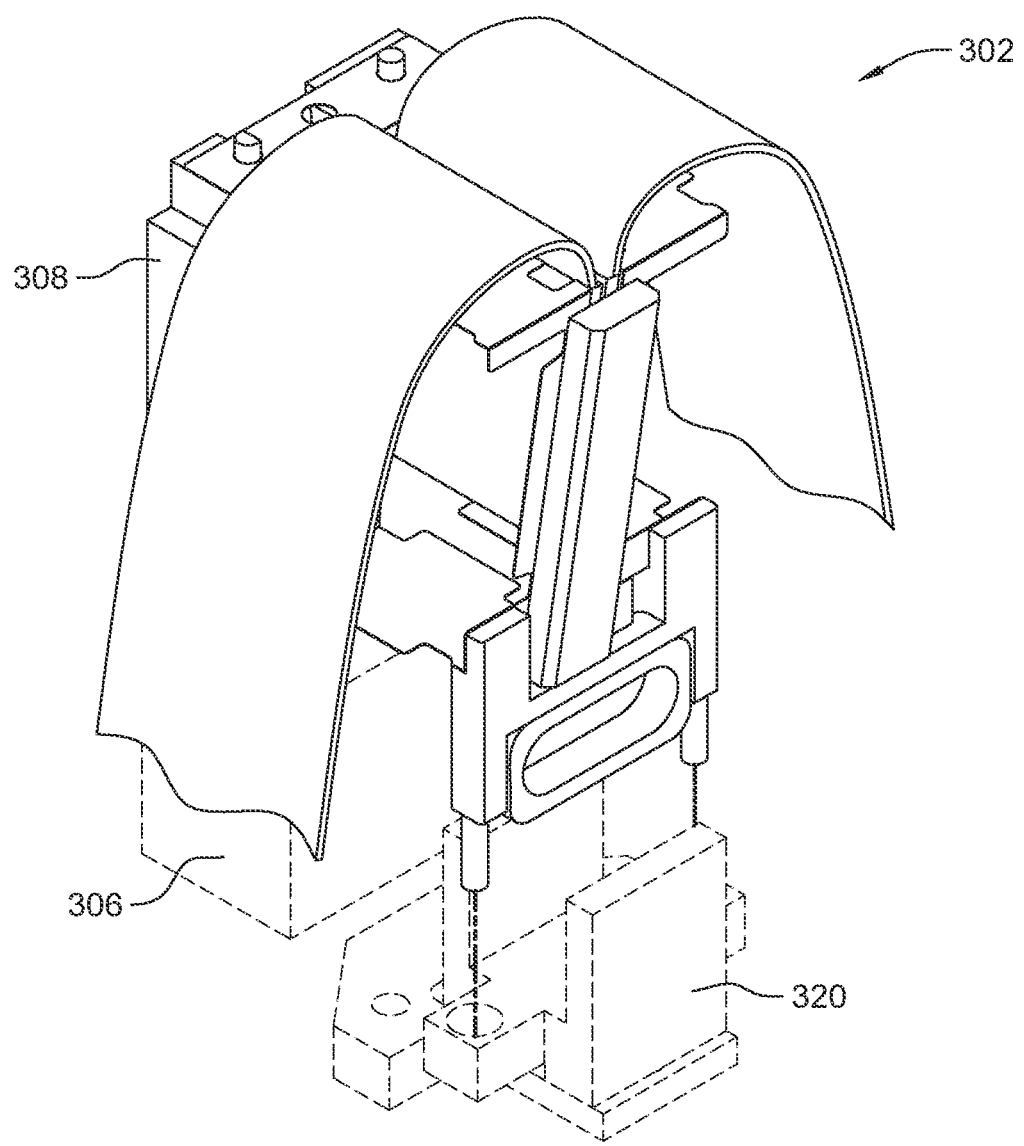
FIG. 19 depicts a three-dimensional view of an example of a reworkable tape track following actuator assembly from FIG. 3 with an installed cabled head assembly aligned with a base, in accordance with an embodiment of the present invention.

FIG. 19 depicts a three-dimensional view of an example of a reworkable tape track following actuator assembly from FIG. 3 with an installed cabled head assembly aligned with a base, in accordance with an embodiment of the present invention. Upon removal of the fasteners from the corresponding block through hole 314A and 314B (not visible in FIG. 18) from block 308, reworkable tape track following actuator assembly 302 is lifted vertically in an upward direction and out of bottom base 306 and base 320.

Figure 20:
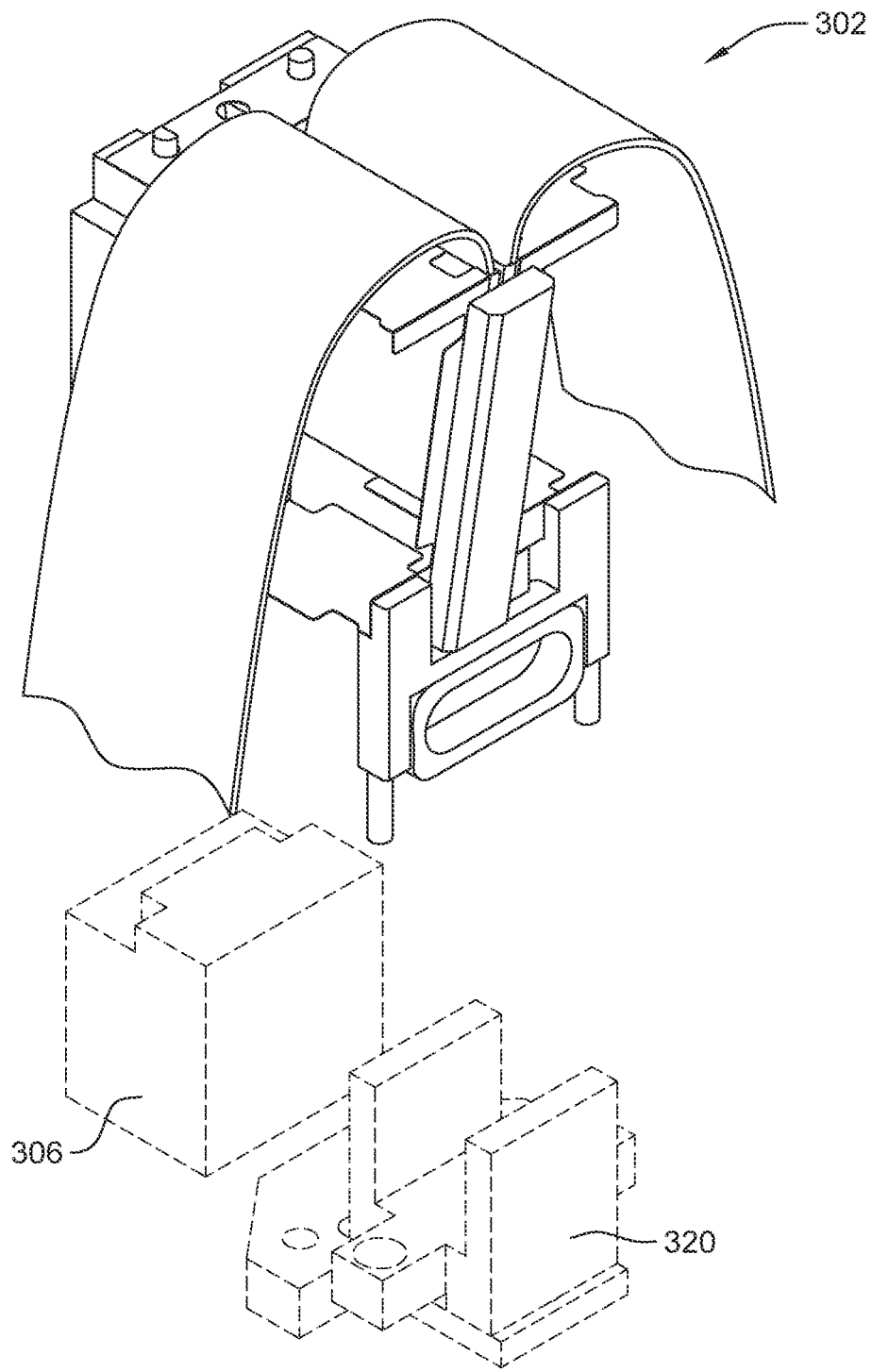
FIG. 20 depicts a three-dimensional view of an example of a reworkable tape track following actuator assembly from FIG. 3 with an installed cabled head assembly being removed from a base, in accordance with an embodiment of the present invention.

FIG. 20 depicts a three-dimensional view of an example of a reworkable tape track following actuator assembly from FIG. 3 with an installed cabled head assembly being removed from a base, in accordance with an embodiment of the present invention. Upon reworkable tape track following actuator assembly 302 clearing bottom base 306 and base 320 during the vertical lifting in the upward direction, reworkable tape track following actuator assembly 302 is removed and any reworking or replacing of reworkable tape track following actuator assembly 302 can be performed.

Figure 21:
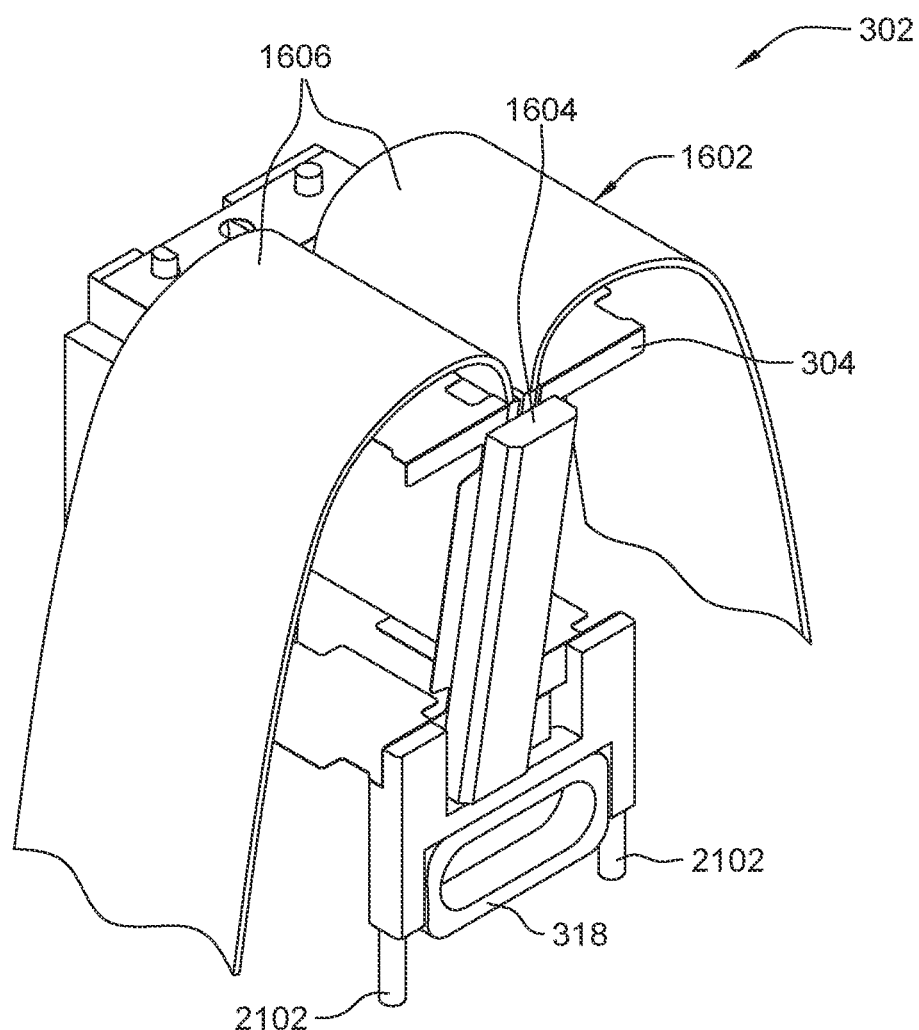
FIG. 21 depicts a three-dimensional view of an example of a reworkable tape track following actuator assembly from FIG. 3 with an installed cabled head assembly removed from a base, in accordance with an embodiment of the present invention.

FIG. 21 depicts a three-dimensional view of an example of a reworkable tape track following actuator assembly from FIG. 3 with an installed cabled head assembly removed from a base, in accordance with an embodiment of the present invention. As previously discussed, reworkable tape track following actuator assembly 302 includes spring actuator 304 folded into a C-shape and includes a zero-degree offset, where cabled head assembly 1602 is disposed in spring actuator 304. Cabled head assembly 1602 includes cabled head module 1604 and flex cables 1606, where cabled head module 1604 is glued between two middle stiffener wings of a middle section of spring actuator 304. Voice coil 318 remains with reworkable tape track following actuator assembly 302 subsequent to removal from base 320 (not illustrated in FIG. 21). Pins 2102 on either side of voice coil 318 of reworkable tape track following actuator assembly 302 are also now visible subsequent to removal from base 320.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of various embodiments of present invention have been presented for the purposes of illustration and they are not intended to be exhaustive and present invention are not limited to the embodiments disclosed. The terminology used herein was chosen to best explain the principles of the embodiments, practical application or technical improvement over technologies found in the marketplace, and to enable others of ordinary skill in the art to understand the embodiments disclosed herein. Many modifications, substitutions, changes, and equivalents will now occur to those of ordinary skill in the art. Such changes, modification, and/or alternative embodiments may be made without departing from the spirit of present invention and are hereby all contemplated and considered within the scope of present invention. It is, therefore, to be understood that the appended claims are intended to cover all such modifications and changes as fall within the spirit of the invention.

What is claimed is:

1. An apparatus for a reworkable tape track following actuator, the apparatus comprising:
   a spring actuator, a head module, a voice coil, and a mounting body, wherein the spring actuator is coupled to the mounting body and the mounting body is removable from a tape drive assembly;
   a top section of the spring actuator disposed between a top plate and a middle block of the mounting body;
   a bottom section of the spring actuator disposed between a bottom plate and the middle block of the mounting body; and
   the head module coupled to a middle section of the spring actuator and the voice coil positioned beneath the head module.

2. The apparatus of claim 1, further comprising:
   one or more block through holes of the mounting body for placement of one or more fasteners, wherein the one or more fasteners secures the middle block to the tape drive assembly.

3. The apparatus of claim 2, wherein the middle section of the spring actuator is at a skew equal to zero and the head module is coupled to the middle section of the spring actuator at a skew equal to zero.

4. The apparatus of claim 2, wherein the middle section of the spring actuator is at a skew greater than zero and the head module is coupled to the middle section of the spring actuator at a skew greater than zero.

5. The apparatus of claim 1, further comprising:
   the voice coil suspended between at least two magnets, wherein the at least two magnets are coupled to a base positioned in the tape drive assembly.

6. The apparatus of claim 5, wherein the spring actuator, the head module, the voice coil, and the mounting body are removable from the base positioned in the tape drive assembly.

7. The apparatus of claim 6, further comprising:
   one or more block through holes of the mounting body for placement of one or more fasteners, wherein the one or more fasteners secures the mounting body to the tape drive assembly.

8. The apparatus of claim 7, wherein the head module coupled to the middle section of the spring actuator is positioned between two middle stiffener wings of the spring actuator.

9. The apparatus of claim 8, wherein an orientation of the voice coil is vertical and in parallel with a placement of the head module.

10. The apparatus of claim 8, wherein an orientation of the voice coil is vertical and perpendicular to a placement of the head module.

11. The apparatus of claim 1, further comprising:
    the voice coil suspended between two sets of two magnets coupled to a base positioned in the tape drive assembly, wherein one portion of the voice coil is suspended between a first set of two magnets and another portion of the voice coil is suspended between a second set of two magnets.

12. The apparatus of claim 11, wherein the spring actuator, the head module, the voice coil, and the mounting body are removable from the base positioned in the tape drive assembly.

13. The apparatus of claim 12, further comprising:
    one or more block through holes of the mounting body for placement of one or more fasteners, wherein the one or more fasteners secures the mounting body to the tape drive assembly.

14. The apparatus of claim 13, wherein an orientation of the voice coil is horizontal and perpendicular to a placement of the head module.

15. The apparatus of claim 1, wherein the head module coupled to the middle section of the spring actuator is positioned between two middle stiffener wings of the spring actuator.

16. The apparatus of claim 15, wherein an adhesive is utilized to couple the head module to the middle section of the spring actuator.

17. The apparatus of claim 1, further comprising:
    a first set of one or more fasteners secures the top section of the spring actuator between the top plate and the middle block; and
    a second set of one or more fasteners secures the bottom section of the spring actuator between the bottom plate and the middle block.

18. The apparatus of claim 17, wherein the top section, the middle section, and the bottom section of the spring actuator form a C-shape for the spring actuator.

19. The apparatus of claim 18, further comprising:
    a first bend between the top section and the middle section; and
    a second bend between the bottom section and the middle section, wherein the first bend and the second bend form the C-shape for the spring actuator.

* * * * *